United States Patent
Bardhan

(10) Patent No.: US 9,430,330 B1
(45) Date of Patent: Aug. 30, 2016

(54) SYSTEM AND METHOD FOR MANAGING ENVIRONMENT METADATA DURING DATA BACKUPS TO A STORAGE SYSTEM

(75) Inventor: Prasun Bardhan, Kolkata (IN)

(73) Assignee: NETAPP, INC., Sunnyvale, CA (US)

( * ) Notice: Subject to any disclaimer, the term of this patent is extended or adjusted under 35 U.S.C. 154(b) by 484 days.

(21) Appl. No.: 12/981,065

(22) Filed: Dec. 29, 2010

(51) Int. Cl.
    *G06F 17/30* (2006.01)
    *G06F 11/14* (2006.01)

(52) U.S. Cl.
    CPC ........ *G06F 11/1448* (2013.01); *G06F 11/1458* (2013.01); *G06F 17/30067* (2013.01); *G06F 17/30073* (2013.01)

(58) Field of Classification Search
    CPC .............. G06F 11/008; G06F 11/0754; G06F 11/1453; G06F 11/1458; G06F 11/3055; G06F 11/3096; G06F 11/3457; G06F 11/1448; G06F 17/30063; G06F 17/30073
    See application file for complete search history.

(56) References Cited

U.S. PATENT DOCUMENTS

| | | | |
|---|---|---|---|
| 6,038,665 A * | 3/2000 | Bolt et al. | 707/999.204 |
| 7,873,601 B1 * | 1/2011 | Kushwah | 707/654 |
| 8,082,227 B2 * | 12/2011 | Balakrishnan et al. | 707/640 |
| 2006/0085792 A1 * | 4/2006 | Traut | G06F 11/1438 718/100 |
| 2007/0174362 A1 * | 7/2007 | Pham et al. | 707/204 |
| 2009/0222496 A1 * | 9/2009 | Liu | G06F 3/0482 |
| 2010/0077161 A1 * | 3/2010 | Stoakes et al. | 711/162 |
| 2011/0145199 A1 * | 6/2011 | Prasad Palagummi | 707/654 |
| 2012/0079326 A1 * | 3/2012 | Riegel et al. | 714/38.1 |
| 2012/0084261 A1 * | 4/2012 | Parab | 707/654 |

* cited by examiner

*Primary Examiner* — Shew-Fen Lin
(74) *Attorney, Agent, or Firm* — Klein, O'Neill & Singh, LLP

(57) ABSTRACT

Described herein is a system and method for managing environment metadata of a server system during a backup session between the server system and a storage system. In some embodiments, during the backup session, the server system sends a sequence of blocks or files comprising backup data and environment metadata to the storage system. The backup data may comprise data on the server that is typically sent to the storage system during a backup session, such as client or application data. The environment metadata may include information describing the server system, such as information describing hardware or software components of the server system or server metrics of the server system. In these embodiments, operations for processing environment metadata may be included with the operations for processing backup data during the backup session.

23 Claims, 13 Drawing Sheets

| Master Directory Data Structure 850 | | | | |
|---|---|---|---|---|
| Path/BN 815 | Server system ID 820 | Type of block/file 825 | Permissions 830 | Visibility Accept/Deny 840 |
| Path_A | ID1 | Backup Data | List1 | Vis1 |
| Path_B | ID2 | Environment Metadata | List2 | Vis2 |
| Path_C | ID3 | Backup Data | List3 | Vis3 |
| ... | ... | ... | ... | ... |
| ... | ... | ... | ... | ... |

FIG. 8

SYSTEM AND METHOD FOR MANAGING ENVIRONMENT METADATA DURING DATA BACKUPS TO A STORAGE SYSTEM

FIELD OF THE INVENTION

Embodiments of the present invention relate to storage systems and, in particular, to managing environment metadata during data backups to a storage system.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network, or a disk assembly directly attached to a server system. The storage devices are typically disk drives (e.g., hard disk drive (HDD) or direct access storage device (DASD)) organized as a disk array.

The storage system may be configured to allow one or more servers to store and access data on the storage system. Each storage system may comprise one or more local or remote storage devices for storing client data from one or more server systems connected to the storage system. From time to time, client backup data stored on a server system may be "backed up" to a storage system. A server operating system may interact with a storage operating system for performing a variety of backup operations. Or, an application running on a server system may interact with a storage operating system for performing a variety of backup operations. The storage operating system of the storage system may implement a high-level module, such as a file system, to logically organize the information stored on volumes as a hierarchical structure of data containers, such as files, blocks, and logical units (LUs). A known type of file system is a write-anywhere file system that does not overwrite blocks on disks unless the blocks are free blocks. An example of a write-anywhere file system that is configured to operate on a storage system is the Write Anywhere File Layout (WAFL®) file system available from NetApp, Inc. Sunnyvale, Calif.

Each server may execute an application, such as a database application, that "connects" to the storage system over a computer network, such as a point-to-point link, a shared local area network (LAN), a wide area network (WAN), or a virtual private network (VPN) implemented over a public network such as the Internet. Each server may request the data services of the storage system by issuing access requests (read/write requests) as file-based and block-based protocol messages (in the form of packets) to the system over the network. For example, a server may request backup services from a storage system by initiating a message exchange with a storage system, and the storage system may further exchange messages with the server system to accomplish transmission of a sequence of protocol messages (in the form of packets), which sequence may be intended to accomplish one or more backup operations.

A plurality of storage systems may be interconnected as multiple nodes to provide a storage system architecture configured to service many servers. Each node may comprise a storage system and a set of storage devices. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a multi-node storage system. The storage objects (e.g., volumes) may be configured to store the content of data containers, such as files and logical units, served by the multi-node storage system in response to multi-protocol data access requests issued by servers. Any volume may have a directory.

The storage systems of the multi-node storage system may be configured to communicate with one another to act collectively to increase performance or to offset any single storage system failure within the multi-node storage system. The multi-node storage system provides data service to servers by providing access to a shared storage (comprising the storage devices of the plurality of storage systems). Typically, server systems will connect with a storage system of the multi-node storage system for data-access sessions with the storage system. During a data-access session with a storage system, a server system may submit access requests (read/write requests) that are received and performed by the storage system.

Each server system typically executes numerous applications that may require data services of a storage system. Various server systems may support different backup applications that have capabilities for backing up data according to different standards and within variously configured storage systems (e.g., under Open Systems, and/or a storage system using SnapVault® technology). Such standards (e.g., Open Systems SnapVault® (OSSV)) can support backup of backup data from various operating systems (OS), backup of application data for various applications, and backup of system state data for various operating systems (e.g., Windows®, Linux®, HP-UX, AIX, and Solaris). Such standards can also support specific applications (e.g., MS-SQL, MS-EXCHANGE, MS-SHAREPOINT, VMWARE, etc.).

The data of the server system that is backed up to a storage system during a backup session may be referred to as "backup data." In addition to backing up the data of a server system, it may also be desirable to monitor environment information (referred to as "environment metadata") for the server system, for example, for analysis, performance optimization, maintenance purposes, etc. Environment metadata may also be sent to the storage system for storage and analysis. Typically, however, a storage system manages backup data and environment metadata through wholly separate sessions (e.g., performing separate operations using separate data structures that are managed separately) resulting in substantial additional use of storage resources. As such, there is a need for an efficient method for handling both backup data and environment metadata.

SUMMARY

Described herein is a system and method for managing environment metadata of a server system during a backup session between the server system and a storage system. In some embodiments, during the backup session, the server system sends a sequence of blocks or files comprising backup data and environment metadata to the storage system. The backup data may comprise data on the server that is typically sent to the storage system during a backup session, such as client or application data. The environment metadata may include information describing the server system, such as information describing hardware or software components of the server system or server metrics of the server system. In these embodiments, operations for processing environment metadata may be included with the operations for processing backup data during the backup session.

For example, environment metadata describing hardware or software components of the server system may comprise the type of processor, type of each memory device, type of local storage device, type of storage device controller, type of operating system, type of file system of the server system, etc. For example, environment metadata describing a server metric of the server system may comprise any measureable attribute, status, or statistic of hardware and/or software components of a server system, such as an attribute relating to power consumption, data capacity, data throughput, processor utilization of the server system, etc.

The storage system may receive and store the sequence of backup data and environment metadata. The storage system may also produce or update a master directory data structure for recording/tracking various information regarding the received backup data and environment metadata. For example, the master directory data structure may be used for recording storage locations of the received backup data and environment metadata, a block/file type specifying whether the block/file is of backup data or environment metadata type, and/or access permissions associated with the backup data and/or environment metadata.

The storage system may then receive, from a user, an access request for accessing the environment metadata of a particular server system. The storage system may use the master directory data structure for determining whether the user has permission to access the environment metadata of the server system, and upon determining that the user has permission to access the environment metadata of the server system, allowing the user to access the environment metadata. The user may require access to the environment metadata for various purposes (e.g., for performance optimization, monitoring, maintenance, etc.).

Also, the storage system may receive a request for restoring data of a particular server system. The storage system may use the master directory data structure for assembling the backup data for the server system by including blocks that comprise backup data for the server system and excluding blocks that comprise environment metadata for the server system and then send the assembled backup data to the server system. The server system may then use the received backup data to perform a restore.

BRIEF DESCRIPTION OF THE DRAWINGS

FIG. 8 shows a conceptual diagram of an exemplary master directory data structure.

DETAILED DESCRIPTION

Figure 1:
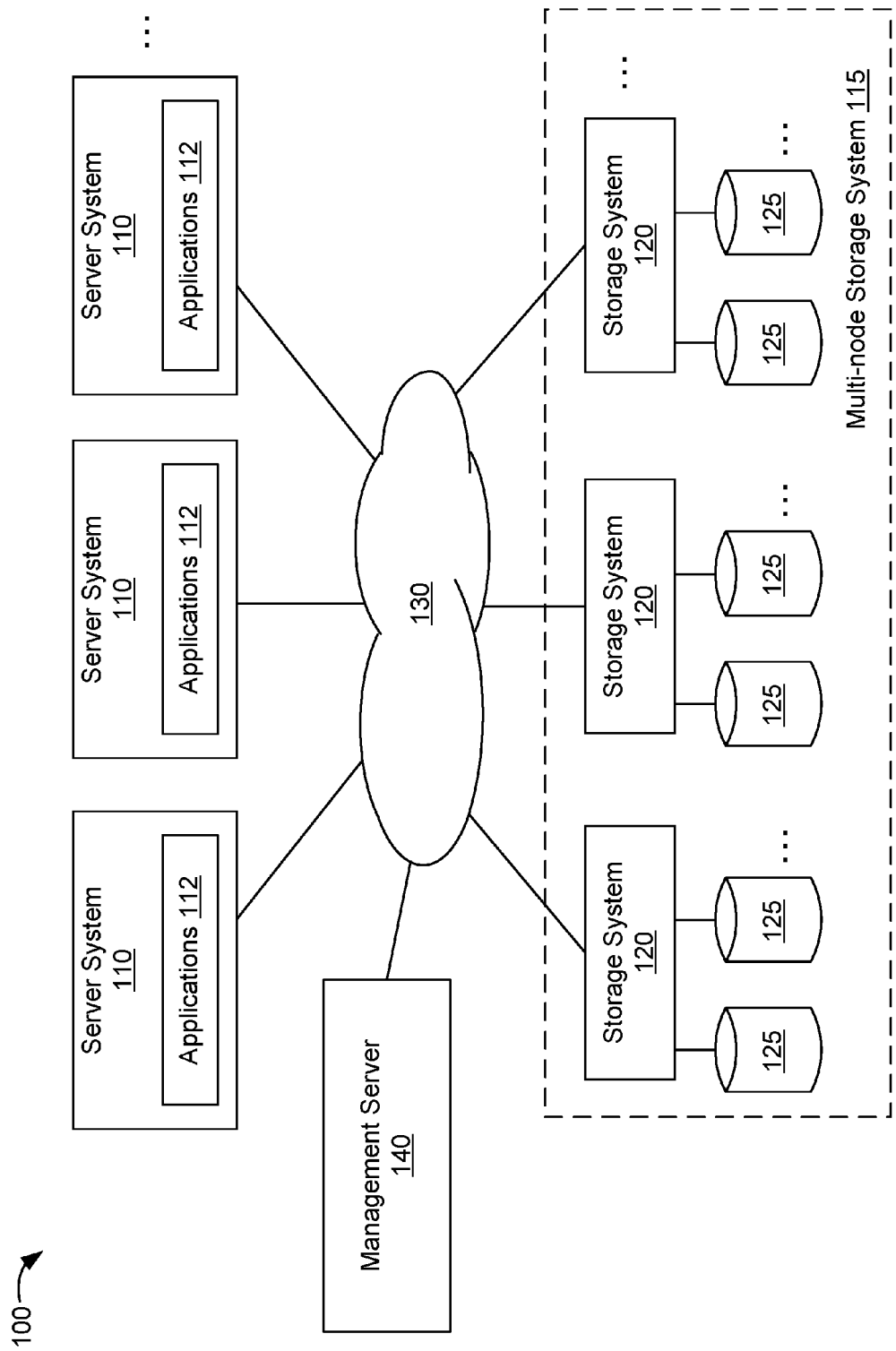
FIG. 1 is a schematic block diagram of an exemplary multi-node storage environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form so as to not obscure the embodiments with unnecessary detail.

The description that follows is divided into five sections. Section I contains terms used herein. Section II describes a storage environment in which some embodiments operate. Section III describes a server system for collecting environment metadata within a storage environment. Section IV describes a management server for accessing and analyzing environment metadata within a storage environment. Section V describes operations producing and accessing environment metadata between components within the storage environment.

I. Terms

Backup Data: As used herein, backup data comprises any data stored on a server system that is backed up to a storage system during a backup session. For example, backup data may comprise client data (such as file data) received from a user/client computer system, application data for an application executing on the server system, files needed by the operating system hosted on the user/client computer system, or any other data stored on the server system. Backup data may sometimes be referred to generically as data herein.

Environment metadata: As used herein, environment metadata comprises information describing a server system, such as information describing hardware and/or software components of a server system, server metrics, or relationship metadata. For example, information describing hardware and/or software components of a server system may include the type and speed of each processor, type and data size of each memory device, type and data size of each local storage device, type of each storage device controller, type and name of the operating system (OS), the file system type, the OS version on which the applications is installed (e.g., Windows™ 2000, 2003, Linux kernel version, etc), types and version numbers of applications executing on the server system, other specific information of applications executing on the server system (e.g., the name and version of an installed application, the name and version of a patch, the name and version of a plug-in, etc). Environment metadata may sometimes be referred to generically as metadata herein.

Relationship Metadata: As used herein, relationship metadata may describe a relationship between two computer systems (e.g., server system and storage system) involved in a backup session. For instance, the relationship metadata may specify that the backup session is for backing up data of a particular server system to a particular storage system, and further specify identifiers for the server system and storage system.

Server Metric: As used herein, a server metric may comprise a measureable attribute, status, or statistic of hardware and/or software components of a server system. A non-exhaustive list of server metric examples include attributes relating to power consumption, data capacity, data throughput, storage device utilization, processor utilization, number of I/O (read/write) operations issued per second, a ratio of various operations ("op mix"), per I/O data block size, number of storage device errors, operational status of hardware components (e.g., whether such components are operating normally or not), etc. In other embodiments, other server metrics are used.

Server System: As used herein a server system may be a single server, or it may be a collection of multiple servers comprising multiple chassis, multiple motherboards, multiple memory spaces, etc. A server system may execute a server operating system or a user/client operating system. In some embodiments a server system executes an operating system in a virtual machine environment. In other embodiments, a server may perform the services requested by only a single user, and thus, may comprise a user/client computer system. In still other embodiments, a server system may be embodied as any computer device (e.g., a mobile terminal, a smart phone, etc).

Storage Object: As used herein, a storage object comprises any logically definable storage element stored or contained within a multi-node storage system, or within a single-node storage system. Each storage object may be stored in a particular aggregate of a particular storage system of the multi-node storage system. A non-exhaustive list of storage object examples include volumes or virtual volumes (e.g., flexible volumes) in a storage system, logical units (LUs) in a Qtree, Qtrees in a volume, disk images in a volume, backup data blocks, metadata blocks, etc. In other embodiments, storage objects comprise any other logically definable storage element stored or contained within the multi-node storage system. Any volume may have a directory of storage objects and any such directory may comprise a directory of backup data, and/or metadata, and/or system data etc.

Storage System: As used herein, a multi-node storage system may comprise a set of one or more storage systems. In other embodiments, only one storage system may be used in the embodiments described below. As such, the terms "multi-node storage system" and "storage system" may sometimes be used interchangeably.

II. Multi-Node Storage Environment

FIG. 1 is a schematic block diagram of an exemplary multi-node storage environment 100 in which some embodiments operate. The environment 100 comprises a set of one or more server systems 110, a multi-node storage system 115 comprising a set of one or more storage systems 120, and a management server 140, which are connected via a connection system 130. Each storage system 120 comprises a set of one or more storage devices 125. The connection system 130 may comprise a network, such as a local area network (LAN), wide area network (WAN), metropolitan area network (MAN), the Internet, or any other type of network or communication system between computer systems.

Each storage system 120 may have a distributed architecture. For example, each storage system 120 may include separate N module (network module) and D module (data module) components (not shown). In such an embodiment, the N module is used to communicate with the server systems 110, while the D module includes the file system functionality and is used to communicate with the storage devices 125. In another embodiment, the environment 100, including server systems 110, management server 140, and storage systems 120) may be embodied in an integrated architecture, where the network and data components are all contained in a single box or unit. The storage system 120 may be coupled through a switching fabric (not shown) to other one or more storage systems 120 in the multi-node storage system 115. In this way, all the storage systems 120 of the multi-node storage system 115 may be interconnected to form a single storage pool that may be accessed by one or more server systems 110.

The storage systems 120 comprise functional components that cooperate to provide a distributed storage system architecture providing consolidated data services to the server systems 110. A server system 110 may comprise a computer system that utilizes services of the multi-node storage system 115 to store and manage data in the storage devices 125 of the storage systems 120. Interaction between a server system 110 and a storage system 120 can enable the provision of storage services. That is, a server system 110, or one or more applications 112 executing on a server system 110 may request the services of a storage system 120, and a storage system 120 may perform operations to satisfy the requested services of the storage system, and may then return the results of the services requested by the server system 110 by exchanging packets over the connection system 130. The server system 110 may request the services of the storage system by issuing packets using file-based access protocols such as the common Internet file system (CIFS) protocol or network file system (NFS) protocol, over the transmission control protocol/Internet protocol (TCP/IP) when accessing information in the form of files and directories. Alternatively, the server system 110 may issue packets, including block-based access protocols—such as the fibre channel protocol (FCP), or Internet small computer system interface (iSC SI) storage area network (SAN) access—when accessing information in the form of blocks.

For example, the server system 110 may request the services of the storage system by requesting operations pertaining to a backup session to backup data from the server system 110 to a storage system 120, and may issue packets using file-based access protocols. As another example, the server system 110 may request the services of the storage system by issuing packets in a particular sequence corresponding to a particular protocol. For yet another example, the server system 110 may request the services of the storage system by issuing packets corresponding to a replication protocol; for example, a standard protocol, or a proprietary protocol such as the logical replication protocol (LREP), a protocol of NetApp, Inc. Sunnyvale, Calif. In particular, a server system 110 may request the services of the storage system by issuing packets corresponding to the LREP protocol for requesting backup services).

The storage system 120 may comprise a computer system that stores data in a set of storage devices 125, preferably on one or more writable storage device media (such as magnetic disks, video tape, optical, DVD, magnetic tape, and/or any other similar media adapted to store information, including data and parity information). The storage system 120 may implement a file system to logically organize the data as storage objects on the storage devices 125. A storage system 120 or a server system 110 may execute one or more applications that submit access requests for accessing particular storage objects on the storage devices 125. The application 112 may implement all or a portion of the LREP protocol.

In some embodiments, the various modules/engines for performing the embodiments described herein may reside and execute on a server system 110, a storage system 120, the management server 140, or any combination thereof.

Figure 2:
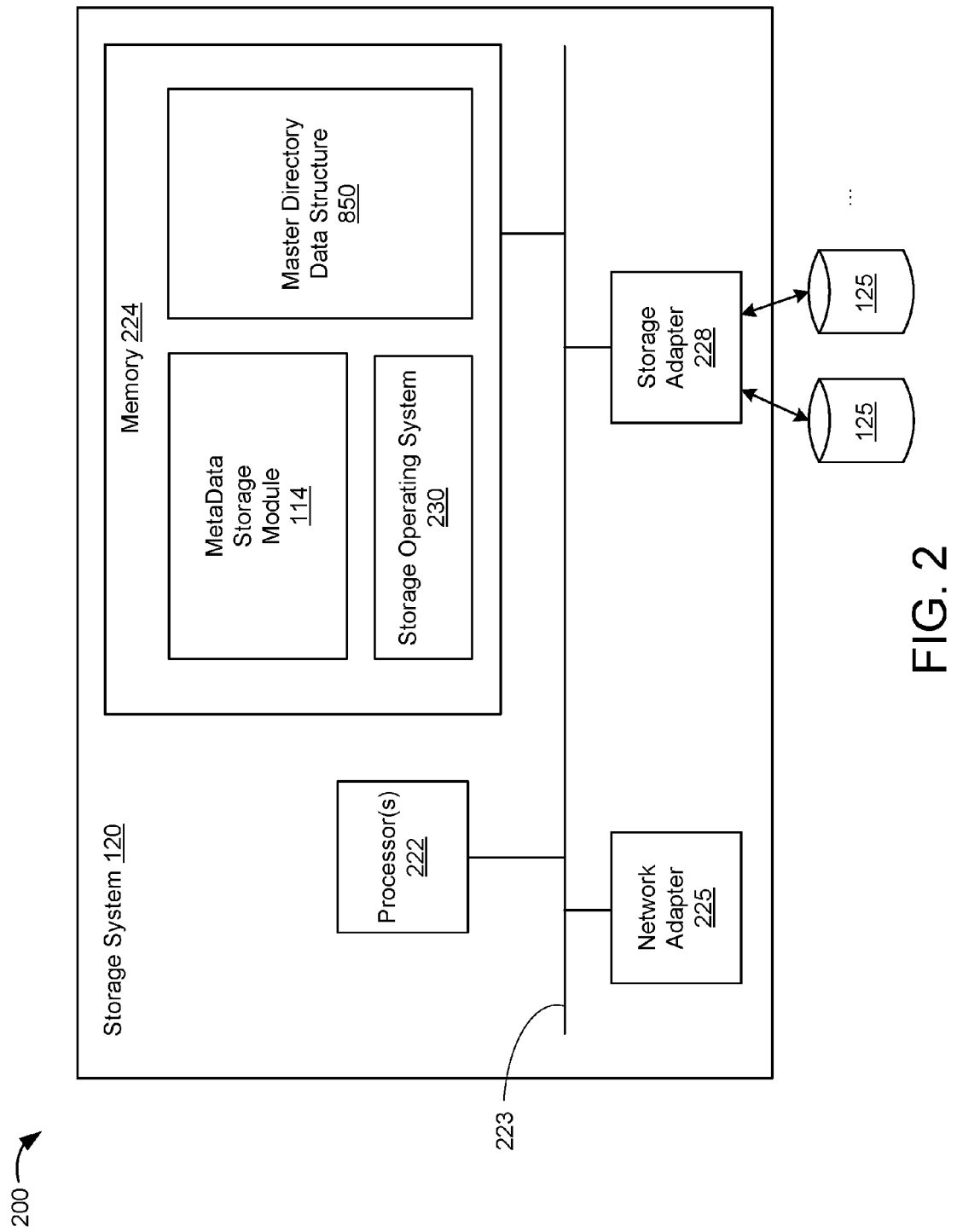
FIG. 2 is a diagram illustrating a node of a multi-node storage environment and showing various components of a storage system.

FIG. 2 is a diagram illustrating a node 200 of a multi-node storage environment and showing various components of the storage system 120, in accordance with some embodiments. Specifically, the storage system comprises one or more processors 222, a memory 224, a network adapter 225, and a storage adapter 228 interconnected by a system bus 223. The storage system 120 executes a storage operating system 230 that implements a storage file system. The memory 224 comprises storage locations that are addressable by the processors 222 and adapters 225 and 228 for storing software program code (such as the storage operating system 230 and metadata storage module 114) and data (such as master directory data structure 850). In some embodiments, the metadata storage module 114 stores backup data and environment metadata to one or more storage devices and produces the master directory data structure 850 for recording/tracking various information regarding the backup data and environment metadata (e.g., address location paths, permissions, etc.). The master directory data structure 850 is discussed below in relation to FIG. 8. The processor and adapters may, in turn, comprise processing elements and/or logic circuitry configured to execute the software code and manipulate various data.

The network adapter 225 comprises a plurality of ports adapted to couple the storage system 120 to one or more server systems 110 over point-to-point links, wide area networks, virtual private networks implemented over a public network (Internet), or a shared local area network. A server system 110 may establish a connection with a storage system 120 through the network adapter 225 to access the storage devices 125 of the storage system (through use of the storage adapter 228). In some embodiments, an application 112 executing on the server system 110 (see FIG. 1) may establish a connection with a storage system 120 to access the storage devices 125.

The storage adapter 228 is coupled with the storage devices 125 of the storage system and cooperates with the storage operating system 230 to access particular data on the storage devices 125 (e.g., as requested by an application 112 executing on the server system 110). The storage adapter 228 comprises a plurality of ports having input/output (I/O) interface circuitry that couples to the storage devices 125 over an I/O interconnect arrangement. The storage operating system 230, portions of which are typically resident in memory 224 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein.

The storage system 120 executes a storage operating system 230 that implements a storage file system. In this sense, the Data ONTAP® storage operating system, available from NetApp, Inc. of Sunnyvale, Calif., that implements a Write Anywhere File Layout (WAFL®) file system, is an example of such a storage operating system implemented as a kernel within an overall protocol stack and associated storage. The storage operating system 230 can also be implemented as an application program operating over a general-purpose operating system, such as UNIX® or Windows®, or as a general-purpose operating system with configurable functionality, which is configured for storage applications as described herein.

The storage operating system 230 may implement the storage file system to logically organize data on the storage devices 125 as one or more storage objects and provide a logical/virtual representation of how the storage objects are organized on the storage devices 125. As such, a multi-node storage system comprised of one or more storage systems 120 may also organize and store one or more storage objects. As used herein, a storage object comprises any logically definable storage element stored or contained within the multi-node storage system 115. Each storage object may be stored in a particular aggregate (comprising a plurality of storage devices 125) of a particular storage system 120 of the multi-node storage system 115. The storage operating system 230 of a storage system 120 also manages access to the storage objects stored on the storage devices 125. In some embodiments, an application 112 may establish a connection with the storage operating system 230 to access the storage devices 125 of the storage system 120. The application 112 may also implement various connections having various protocols to establish a connection with the storage system 120, such as an iSCSI or a transport control protocol (TCP) connection.

Each storage system 120 may execute one or more applications and each server system 110 may execute one or more applications 112, each application 112 using data services of the multi-node storage system 115. For example, each application 112 may submit access requests for accessing particular storage objects on the storage systems 120 of the multi-node storage system 115, and the multi-node storage system 115 may perform the received requests on the storage objects. As such, each application may be considered a "workload" of the multi-node storage system 115.

III. System for Collecting Environment Metadata

Figure 3:
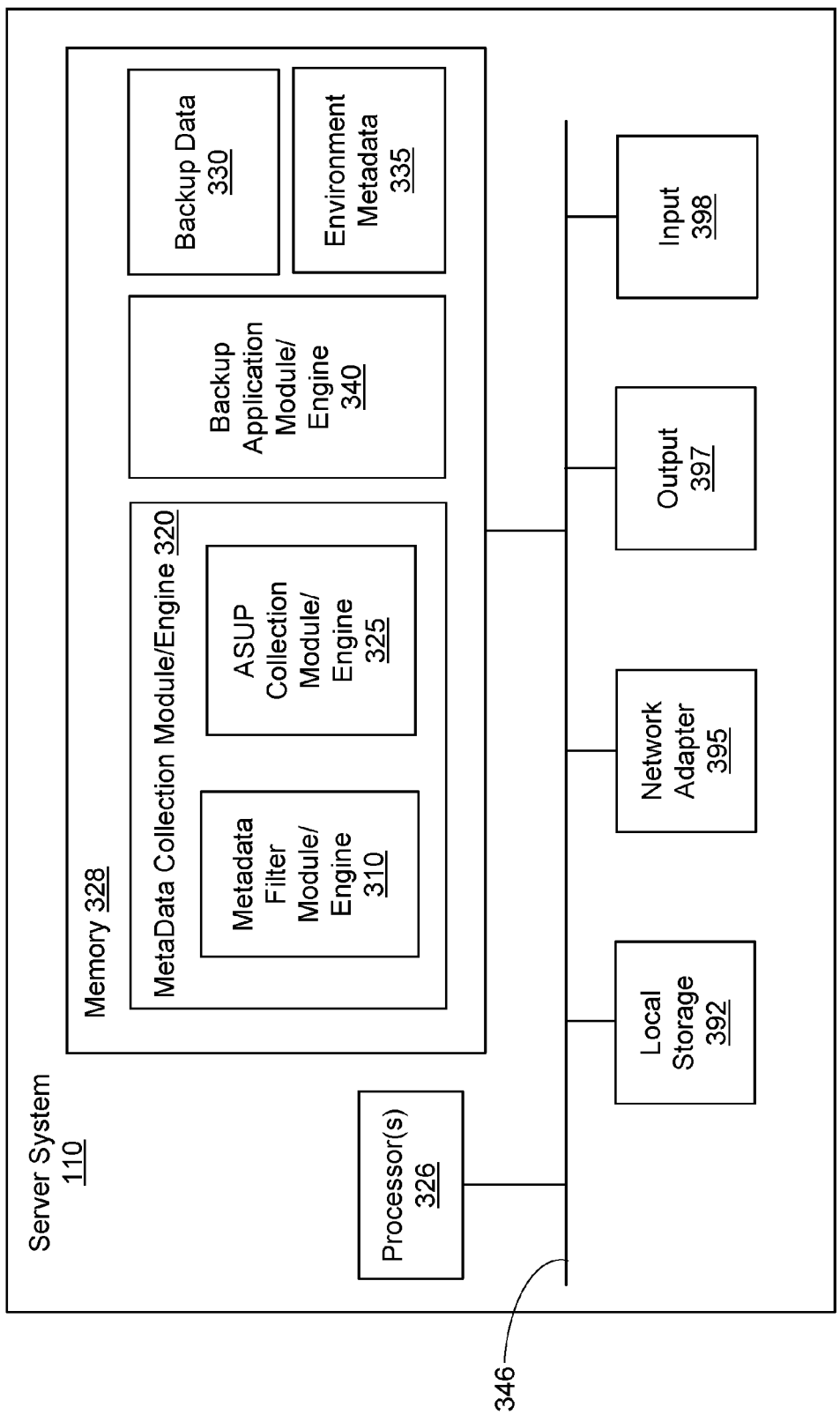
FIG. 3 is a schematic block diagram illustrating an exemplary server system that may be employed in a multi-node storage environment.

FIG. 3 is a schematic block diagram illustrating an exemplary server system 110 that may be employed in the multi-node storage environment of FIG. 1. The server system 110 comprises server processor(s) 326, server memory 328, a server local storage 392, a server network adapter 395, an output component 397, and an input component 398 coupled by a bus 346.

The server processors 326 are the central processing units (CPUs) of the server system 110 and, thus, control the overall operation of the management server 140. Server processors 326 may include one or more programmable general-purpose or special-purpose microprocessors, digital signal processors (DSPs), programmable controllers, application specific integrated circuits (ASICs), programmable logic devices (PLDs), or the like, or a combination of such devices. The server network adapter 395 comprises a plurality of ports adapted to couple the server system 110 to one or more other computer systems (such as a management server 140 or storage systems 120) over point-to-point links, wide area networks, and/or virtual private networks implemented over a public network (Internet) or a shared local area network. The server network adapter 395 thus may comprise the mechanical, electrical and signaling circuitry needed to connect the storage system to the network.

The output component 397 may be of any type generally used by a computer system to provide information to an end user (e.g., administrator). For example, the output component 397 could include a monitor, an audio speaker, or an alphanumeric display. Similarly, the input component 398 may be of any type that allows an end user to provide input into a computer system. For example, the input component 398 may be a keyboard, a mouse, or a speech recognition system. The input component 398 may be used, for example, by an administrator inputting or modifying specifications for metadata, etc.

Server memory 328 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein. Server memory 328 comprises storage locations that are addressable by the server processor 326 and server network adapters 395 for storing software program code, such as the software described herein. The server processor 326 and server network adapters 395 may, in turn, comprise processing elements and/or logic circuitry configured to execute the software code. Such software code may include a metadata collection module 320 and/or a backup application module 340.

Server local storage 392 is a storage device that stores data of the server system, such as data needed or used by the various modules/engines (e.g., metadata collection module 320, backup application module 340, etc.) for performing the embodiments described herein. Such data may include all data used for all applications of the server system, including server system configuration settings, visualization template data, reporting template data, etc. The server system 110 loads data stored on the server local storage 392 into server memory 328 from which they are accessed by server processors 326.

Some or all data on the server local storage 392 may be loaded into server memory 328 for processing during a backup session with a storage system, the data being backed up referred to as backup data 330. The server local storage 392 may also store environment metadata 335 produced by one or more various modules/engines upon performing the embodiments described herein. In some embodiments, the metadata collection module 320 produces and stores environment metadata 335 comprising information describing the server system 110 on which the metadata collection module 320 resides.

As described below, a metadata collection module 320 may be configured for producing and collecting environment metadata describing the server system on which it resides. A metadata collection module 320 may include a metadata filter module 310 for storing filtered (e.g., duplicate data filters, time-wise filtered, reformatted) environment metadata. A metadata collection module 320 may also include one or more support functions for automatically collecting configuration details, events alerts, and various storage profiling features. A metadata collection module 320 may include an auto support (ASUP) collection module 325. In one embodiment, an ASUP collection module 325 may include web-based tools for managing and presenting system configuration details, performance charts, events alerts, proactive system health checks, configuration compare utilities, ONTAP feature lists and advice, and various storage efficiency profiling features.

For example, an ASUP module 325 may collect specific user-configurable features supporting monitoring and reporting of performance trends, displays including device visualization (system, disk, RAID, Qtree, capacity), configuration compare utilities, storage efficiency profiling tools, viewers for ASUP history and events, triggering of a proactive health check summary, ASUP event email notification, etc. The above mentioned may be used in ASUP management of remedial services (e.g., issues related to configurations, improper configuration of system upgrade planning, incorrect system parameters set-up, use of out-of-date disk firmware or ONTAP software, etc). Additionally, the ASUP features and/or user-configurable features may include support for aggregated system risk detection, storage disruption issues, critical performance history, etc.).

The server systems 110 may be general-purpose computers configured to interact with a node 200. That is, each server system 110 may request the services of the node 200 (e.g., by submitting read/write requests), and the node 200 may return the results of the services requested by the server system 110 by exchanging packets over the network 140. The server system 110 may submit access requests by issuing packets using file-based access protocols, such as the common Internet file system (CIFS) protocol or network file system (NFS) protocol, over the transmission control protocol/Internet protocol (TCP/IP) when accessing information in the form of files and directories. Alternatively, the server system may submit access requests by issuing packets using block-based access protocols, such as a small computer systems interface (SCSI) protocol encapsulated over TCP (iSCSI), and/or SCSI encapsulated over fibre channel protocol (FCP), when accessing information in the form of blocks.

In some embodiments, a server system 110 connects to a storage system 120 for a data-access session or a backup session with the storage system 120. During a data-access session, the server system 110 may submit access requests that are received and performed by the storage system 120. Such access requests may include storage state requests, a storage state request comprising a request that alters the data state of a storage device 125. Examples of storage state requests include requests for storing new data to a file, deleting a file, changing attributes of a file, etc. For illustrative purposes, storage state requests may be generically referred to herein as write requests.

During a backup session, the storage system 120 may initiate a backup session with the server system 110 (e.g., according to a preset time schedule). In other embodiments, the server system 110 may submit a backup request to the storage system 120 for backing up some or all data stored on the server system 110. In still other embodiments, the management server 140 may submit a backup request to the storage system 120 for backing up some or all data stored on the server system 110. The server system 110 hosts and executes application software (such as backup application module 340) configured for backing-up data to a storage system 120. A server system 110 may host an open system variant of backup software. For example, an open system variant of backup software can include an instance of Open Systems SnapVault technology (OSSV) for performing backup operations using a storage system 120. Some embodiments support applications that backup file data stored on server systems 110, the server systems executing one or more operating systems (e.g., Windows, Linux, HP-UX, AIX, and Solaris, etc.). Such applications for performing backup of file data may include MS-SQL, MS-EXCHANGE, MS-SHAREPOINT, VMWARE, etc. Some embodiments support backup of application data comprising data of applications executing on the server system.

Some embodiments host Open Systems SnapVault technology. As used herein, OSSV refers to the Open Systems SnapVault system, which is commercially available from NetApp, Inc. Sunnyvale, Calif. OSSV is a heterogeneous system for backup of a primary platform to a secondary platform. An OSSV primary platform may comprise a computer system running an operating system (such as Solaris™, HP-UX, AIX, Windows, IRIX, or Linux®, etc.) that requires backup services. For example, the OSSV primary platform may comprise a server system 110, a user/client computer system, etc. that requires backup services for its data. The OSSV secondary platform may comprise a storage system 120 that stores the backup data of the primary platform. An OSSV system may comprise all various modules and components required to perform an OSSV backup of a primary platform to a secondary platform.

In exemplary operation of OSSV, a directory or file system accessible by a primary platform (e.g., server system 110) is selected to be backed up and a data set comprising the selected directory or file system is mapped to a storage object on a secondary platform (e.g., mapped to a Qtree on a storage system 120). Once the data set to be backed up is identified and a destination volume/Qtree is selected as the secondary platform, an agent module may be installed on the primary platform and backup parameters configured. During installation, the agent module may install various subdirectories and files on the primary platform, which files may include an OSSV primary platform database, a set of OSSV executables, an OSSV log file, and OSSV exclude list files. Once installation has completed, the OSSV system can perform initial backups (e.g., including backup of entire files), block-level incremental backups, open file backups, backups of MS-SQL databases, backups of virtual machines, health checks, checkpoint restarts, updates of exclude lists, system state backup and restore, etc.

In addition to backup of data of the primary platform to the secondary platform (e.g., backup data of a server system 110 to a storage system), some embodiments also produce and store environment metadata describing the primary platform to the secondary platform. For example, the environment metadata may include information describing hardware and/or software components of the primary platform, platform metrics, or relationship metadata.

IV. Management Server for Accessing Environment Metadata

In some embodiments, after environment metadata for a server system is stored to a storage system, a management server 140 may access the environment metadata for the server system. The management server 140 may access the environment metadata, for example, for analysis, monitoring, performance optimization, maintenance purposes, or any other purpose.

Figure 4A:
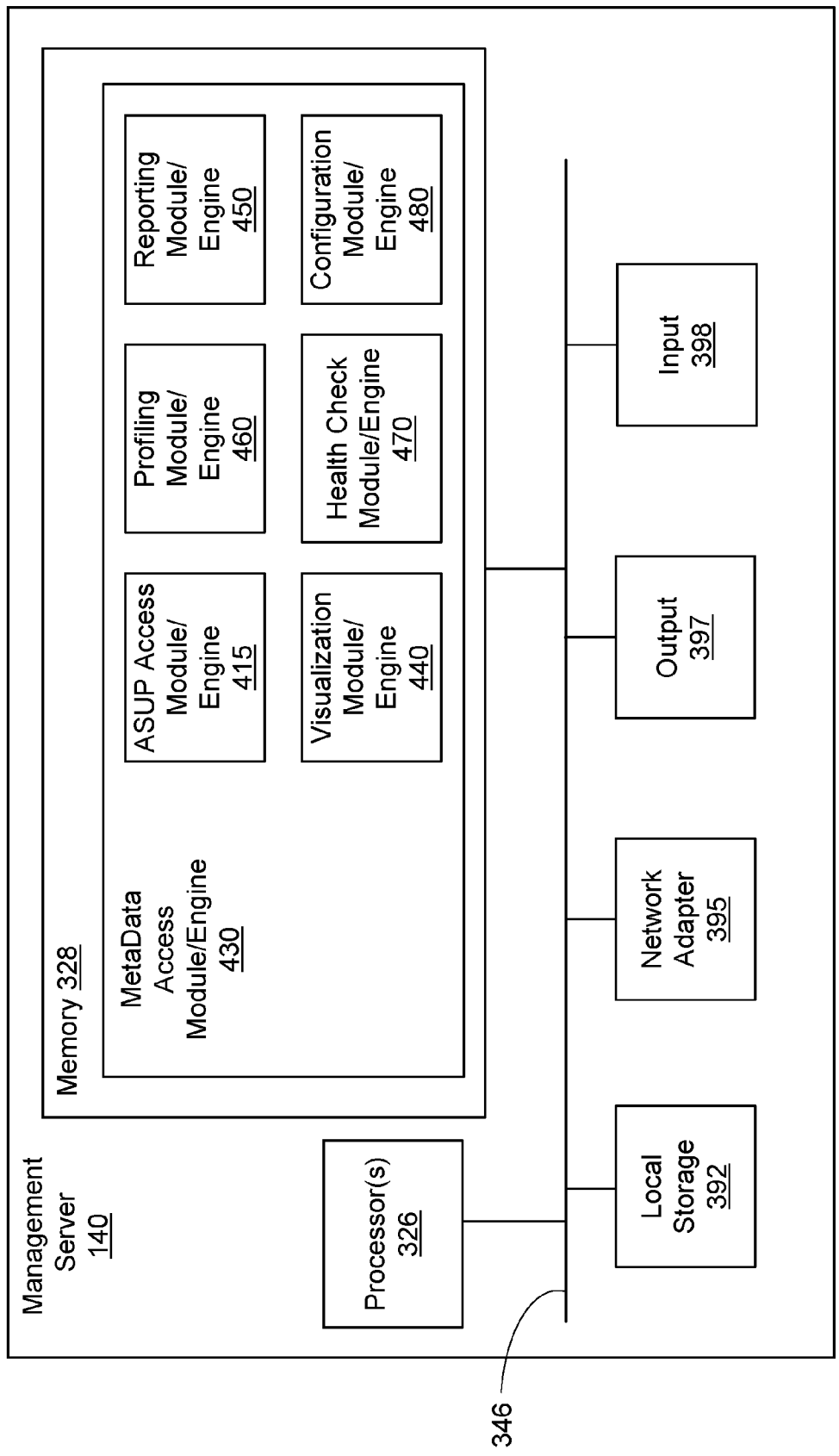
FIG. 4A is a schematic block diagram of an exemplary management server that may be employed in the multi-node storage environment.

FIG. 4A is a schematic block diagram illustrating an exemplary management server 140 that may be employed in the multi-node storage environment of FIG. 1. The management server 140 may comprise components similar to components of the server system 110 (shown in FIG. 3) and are not discussed in detail here. For example, the management server 140 comprises server processor(s) 326, server memory 328, a server local storage 392, a server network adapter 395, an output component 397, and an input component 398 coupled by a bus 346.

Server memory 328 comprises storage locations that are addressable by the processor 326 and adapters 395 for storing software program code, such as the modules described herein. Such software code may include a metadata access module 430 comprising an ASUP access module 415, visualization module 440, a reporting module 450, a profiling module 460, a health-check module 470, and a configuration module 480. In some embodiments, the various modules may configure hardware components of the management server 140 to produce a metadata access engine 430 comprising an ASUP access engine 415, a visualization engine 440, a reporting engine 450, a profiling engine 460, a health-check engine 470, and a configuration engine 480. In some embodiments, the various modules/engines for performing the embodiments described herein may reside and execute on a server system 110, a storage system 120, the management server 140, or any combination thereof. As described below, a metadata access module 430 may be configured to access environment metadata for analysis.

Server local storage 392 is a storage device that stores data needed by the various modules/engines for performing the embodiments described herein. Such data may include all data used for all workloads of the multi-node storage system, multi-node storage system configuration settings, visualization template data, reporting template data, etc. The management server 140 loads data stored on the server local storage 392 into server memory 328 therefrom which they are accessed by server processors 326. The server local storage 392 may also store data produced by the various modules/engines upon performing the embodiments described herein. For example, such data may include backup data and/or environment metadata.

Figure 4B:
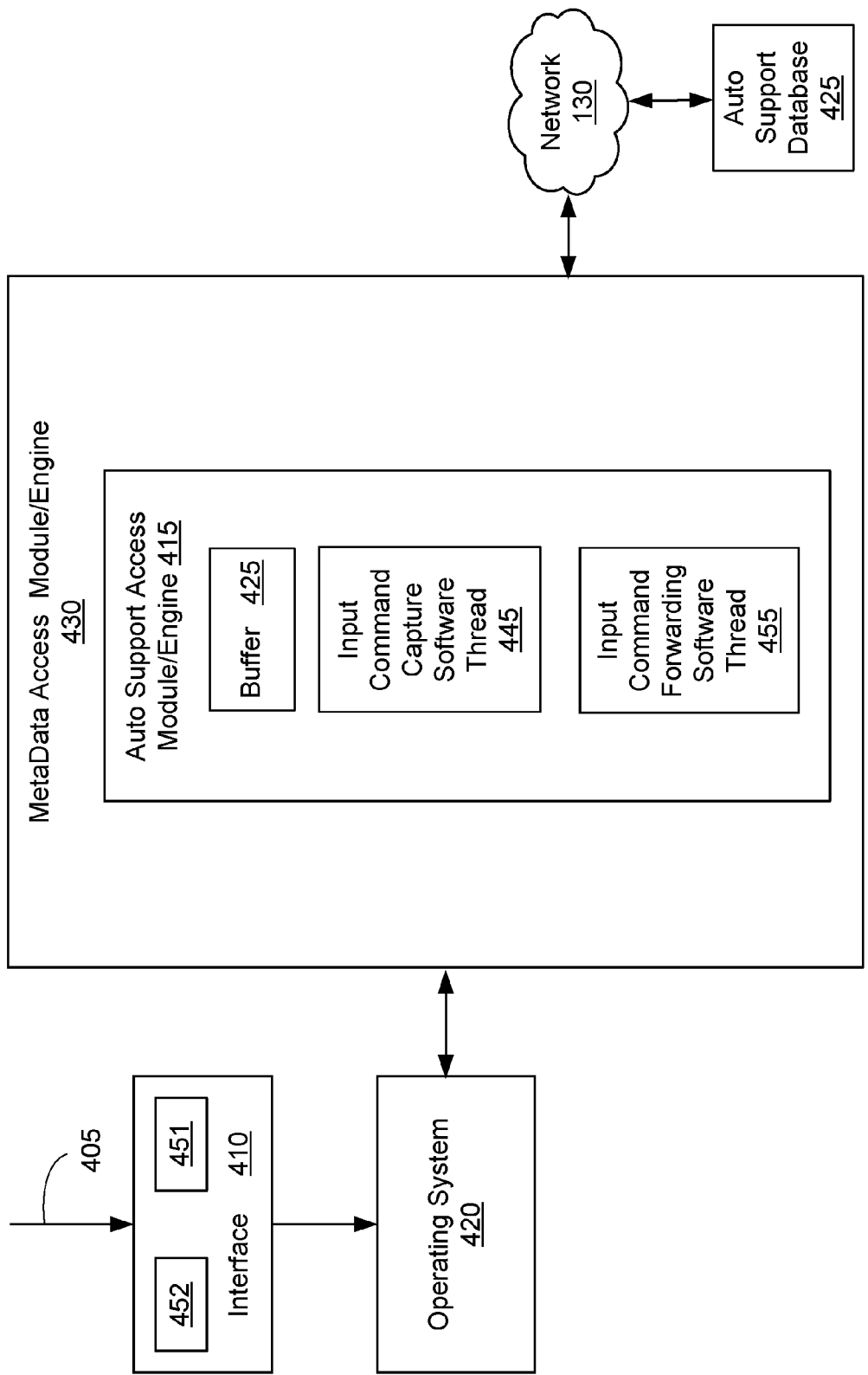
FIG. 4B is a conceptual diagram of operations of an exemplary management server and illustrates additional components of a management server.

FIG. 4B is a conceptual diagram of operations of an exemplary management server and illustrates additional components of a management server 140. An administrator or user can provide an input command 405 via an interface 410 of the management server 140. The input command 405 is used, for example, to permit the user to control or manage user-configurable settings. Examples of the interface 410 include, but are not limited to, a command line interface (e.g., CLI 452) or the zephyr API (e.g., ZAPI 451), which is an application interface that is provided by NetApp, Inc.

An operating system 420 of the management server 140 processes the input commands 405 for performing operations based upon the received input commands 405. The operating system 420 may send the received input commands 405 to the ASUP access module 415 for further processing. Typically, a user can enable or disable any or all of the operations of the ASUP access module 415. One example of an ASUP access module is the Data ONTAP 7G auto support access module which is commercially available from NetApp, Inc. However, other types of access modules may be used.

The ASUP access module 415 may include an input command capture software thread 445 that copies the input commands 405, including syntax, command line arguments, and/or other parameters of the input commands 405. The copy of the input commands 405 are buffered in the buffer 425. In the embodiment shown in FIG. 4B, an input command forwarding software thread 455 forwards the input command 405 (e.g., from buffer 425) to an auto support database 425. The auto support database 425 may be stored on the management server 140 or on a separate computer system connected via network 130. The auto support database 425 may be any suitable database such as, for example, an Oracle database or another suitable type of database product. The ASUP access module 415 may forward (e.g., to the auto support database 425) a copy of each input command 405 that is received by the interface 410. The copies may be transmitted by the ASUP access module 415 to the auto support database 425 at periodic time intervals.

V. Operations for Producing and Accessing Environment Metadata

Described herein is a system and method for managing environment metadata of a server system during a backup session between the server system and a storage system. In some embodiments, during the backup session, the server system sends a sequence of blocks or files comprising backup data and environment metadata to the storage system. The backup data may comprise data on the server that is typically sent to the storage system during a backup session, such as client or application data. The environment metadata may include information describing the server system, such as information describing hardware or software components of the server system or server metrics of the server system. In these embodiments, operations for processing environment metadata may be included with the operations for processing backup data during the backup session. In some embodiments, backup data and environment metadata are managed and stored using data and metadata inodes.

Figure 5A:
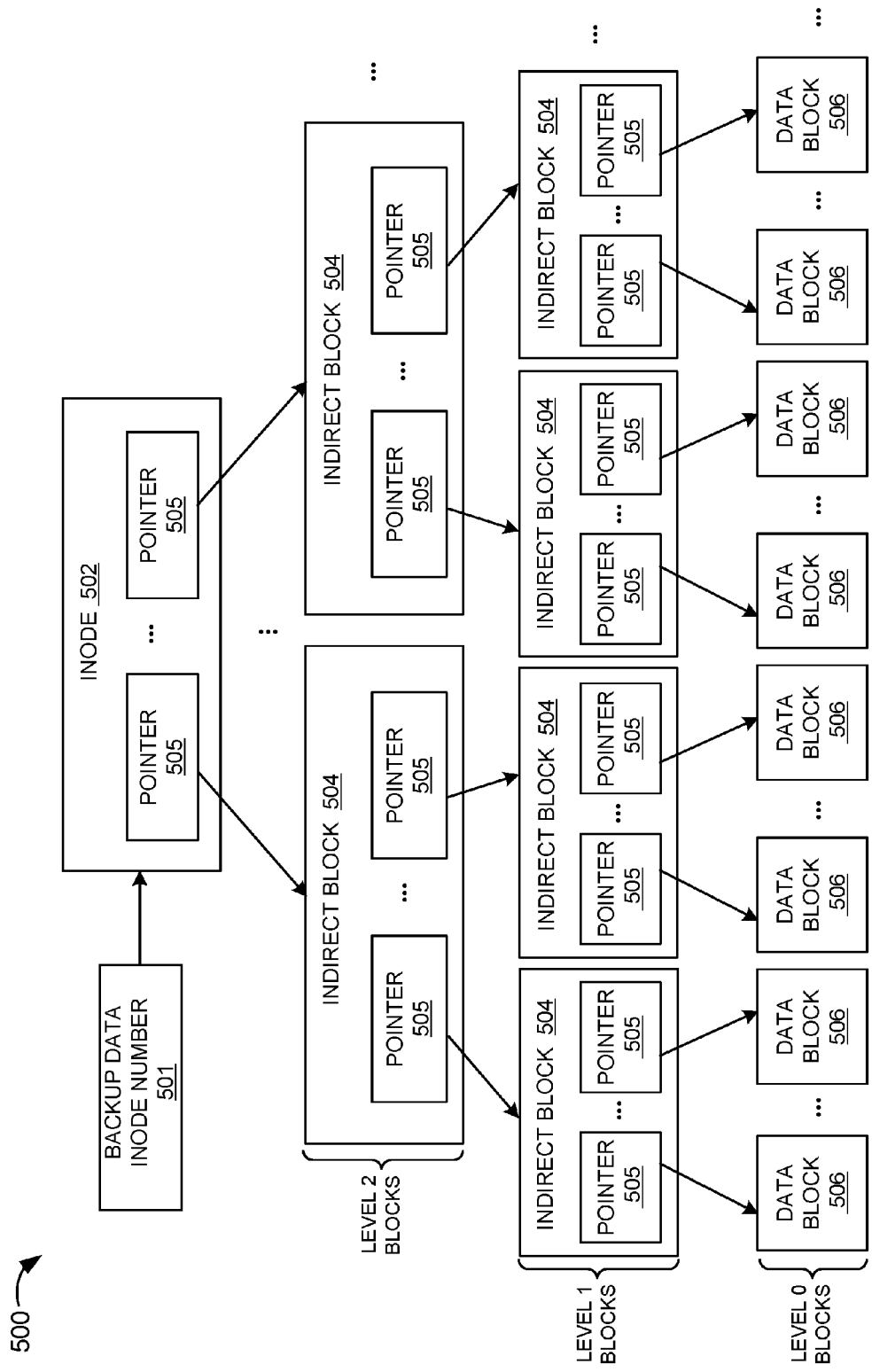
FIG. 5A is a conceptual diagram of an exemplary inode data structure (buffer tree) for storing backup data blocks.

FIG. 5A is a conceptual diagram of an exemplary inode data structure (buffer tree) representing backup data blocks. The inode data structure 500 may comprise an internal representation of backup data blocks for a file loaded into the memory and maintained by the file system. An inode data structure for a file may comprise a root level inode 502, zero or more indirect blocks 504, and one or more data blocks 506 (comprising the backup data). The root level inode 502 may store information about the file (such as name of the file, when the file was produced or last modified, ownership of the file, access permission for the file, size of the file, etc.). An inode 502 may also contain pointers 505 that ultimately lead to the storage locations of the data blocks 506 of the file. For relatively small files, the pointers 505 in the inode may lead directly to the data blocks 506. For larger files, however, one or more levels of indirection may be needed and the pointers 505 may lead to indirect blocks 504 that also store pointers 505 ultimately leading to the data blocks 506 of the file.

An indirect block 504 stores pointers 505 to data blocks 506 or other indirect blocks. The inode data structure 500 may implement zero or more levels of indirect blocks 504. As used herein, one level of indirection comprises one level of indirect blocks, each indirect block in the level being referenced (pointed to) by a pointer in an inode or indirect block and also containing pointers that reference (point to) data blocks or other indirect blocks. In the example of FIG. 5A, the inode data structure 500 comprises two levels of indirect blocks 504 (levels 1 and 2). In other embodiments, the inode data structure 500 may comprise a different number of indirection levels depending upon the size of the file.

Each level 2 indirect block 504 may contain pointers to level 1 indirect blocks. Each level 1 indirect block 504 may contain pointers to data blocks (level 0 blocks) that contain the actual data of the file (comprising the backup data). The pointers to the data blocks may comprise address locations indicating where the data blocks are stored on a storage device. For example, the address location may comprise a unique logical block number (LBN) given by the file system for each data block of the file for locating the data block. The storage address location (e.g., LBN) of a data block may be used to locate and retrieve data from the data block.

Figure 5B:
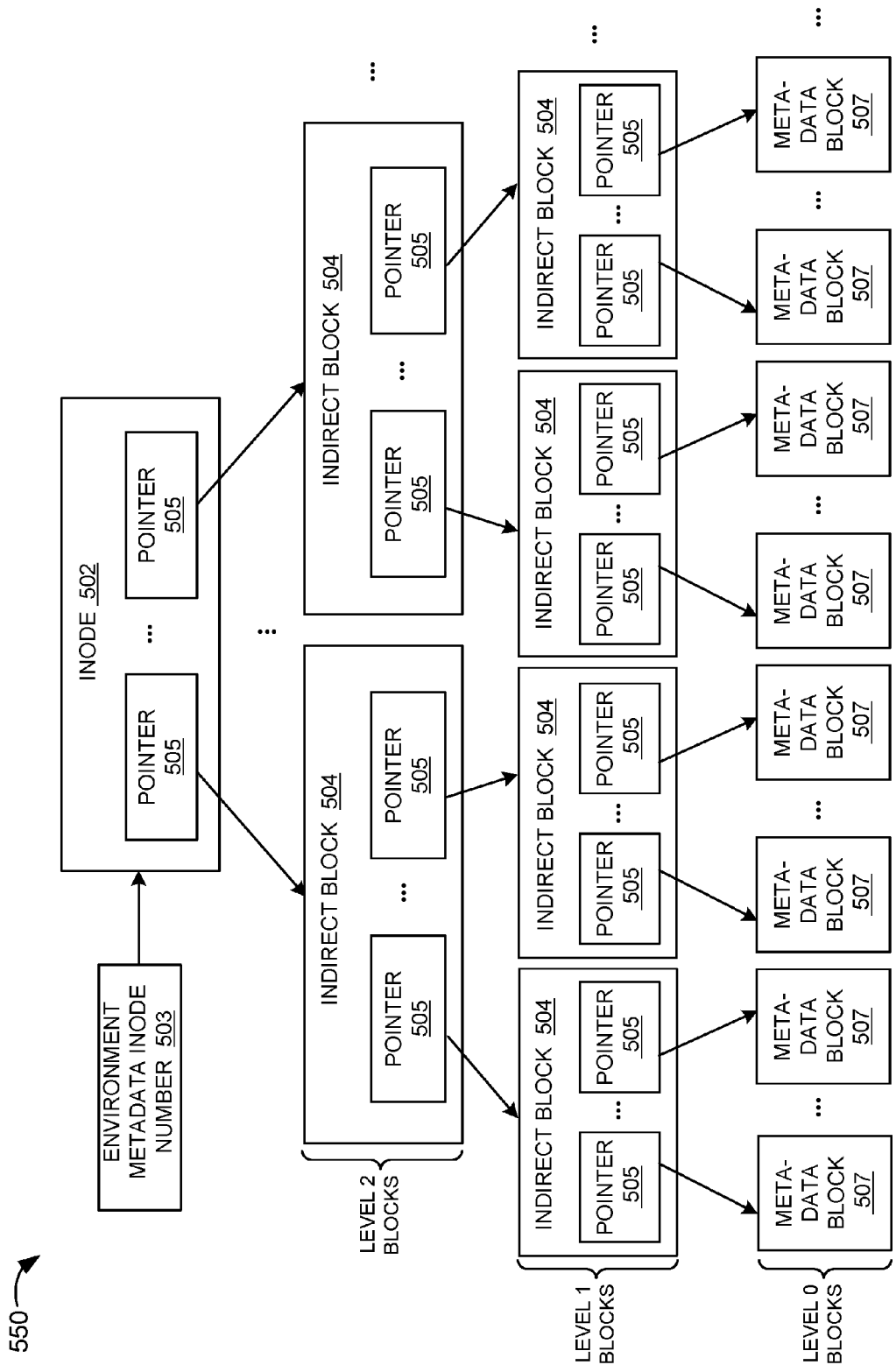
FIG. 5B is a conceptual diagram of an exemplary inode data structure (buffer tree) for storing environment metadata blocks.

FIG. 5B is a conceptual diagram of an exemplary inode data structure (buffer tree) representing a file for storing environment metadata blocks. The inode data structure 550 may comprise an internal representation of metadata blocks for a metadata file loaded into the memory and maintained by the file system. An inode data structure for a metadata file may comprise a root level inode 502 accessed using a negotiated metadata inode number 503, which in turn addresses zero or more indirect blocks 504, and one or more metadata blocks 507 (comprising the environment metadata). The root level inode 502 may store information about the metadata file (such as name of the file, when the file was produced or last modified, ownership of the file, access permission for the file, size of the file, etc.). An inode 502 may also contain pointers 505 that ultimately lead to the storage locations of the metadata blocks 507 of the metadata file. For relatively small metadata files, the pointers 505 in the inode may lead directly to the metadata blocks 507. For larger metadata files, however, one or more levels of indirection may be needed and the pointers 505 may lead to indirect blocks 504 that also store pointers 505 ultimately leading to the metadata blocks 507 of the metadata file.

Figure 5C:
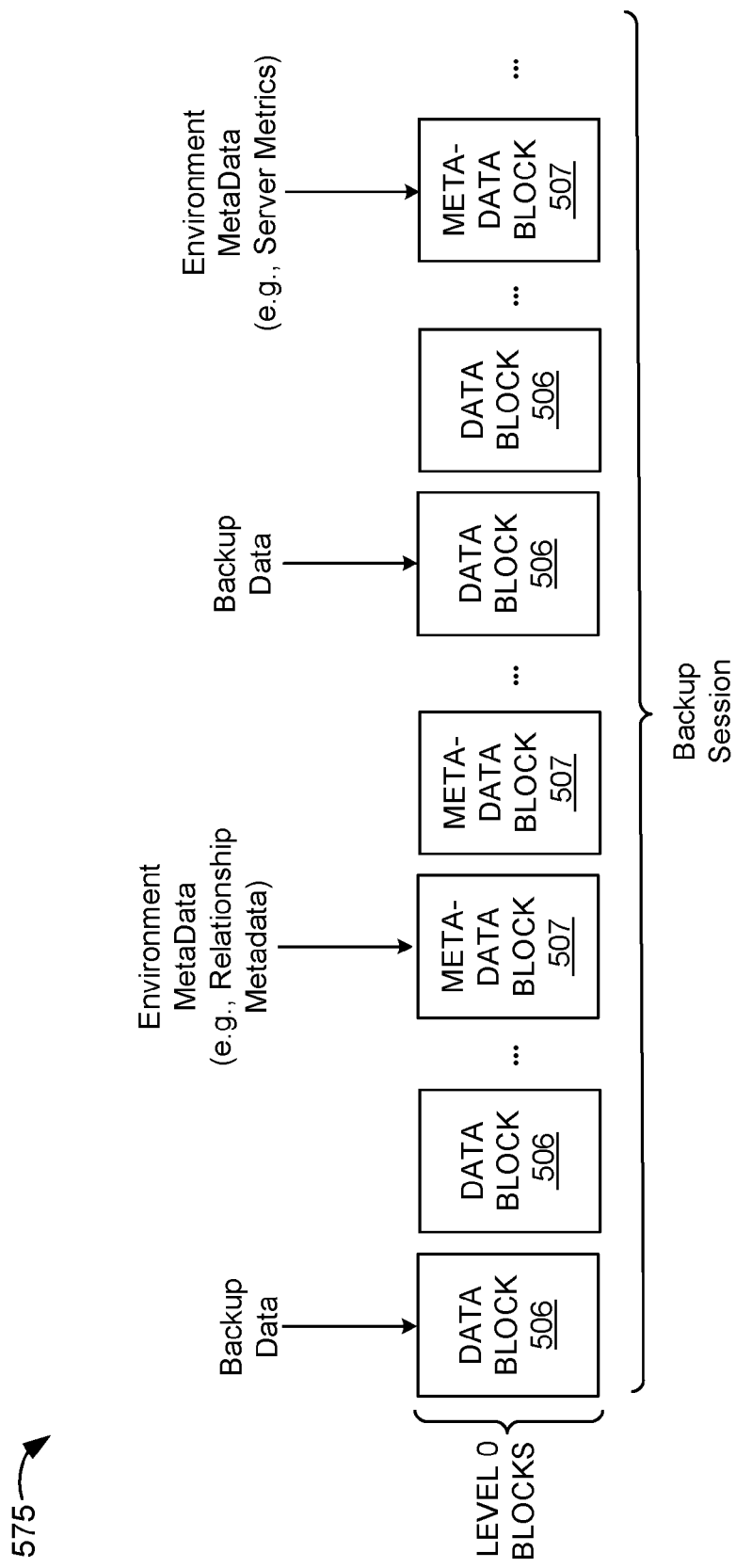
FIG. 5C is a conceptual diagram showing a sequence of transactions of backup data blocks and environment metadata blocks during a backup session.

FIG. 5C is a conceptual diagram showing a sequence of data and metadata blocks 575 sent from a server system to a storage system during a backup session between the server system and the storage system. The sequence of data and metadata blocks 575 may indicate the time order that the data and metadata blocks are sent by the server system as well as the time order that the data and metadata blocks are received by storage system.

As shown in FIG. 5C, the sequence 575 may comprise environment metadata blocks 507 that may be sent from a server system to a storage system along with backup data blocks 506 during a backup session between the server system and the storage system. The backup data blocks 506 may be accessible by a backup data inode number 501 and the environment metadata blocks 507 may be accessible by an environment metadata inode number 503. In these embodiments, operations/transactions for processing environment metadata blocks 507 are included in the operations/transactions for processing backup data blocks 506 during a backup session. In some embodiments, the sequence 575 may comprise environment metadata blocks 507 that may be sent as a metafile before sending any backup data blocks 506 during the backup session.

In further embodiments, the sequence 575 may comprise environment metadata blocks 507 that may be interleaved with backup data blocks 506 during the backup session, whereby backup data blocks 506 and environment metadata blocks 507 are alternately sent to the storage system. In some embodiments, the sequence 575 may comprise a set of backup data blocks 506 that are between a first set of environment metadata blocks 507 (that are sent before the set of backup data blocks 506) and a second set of environment metadata blocks 507 (that are sent after the set of backup data blocks 506). In some embodiments, the sequence 575 may comprise a set of environment metadata blocks 507 that are between a first set of backup data blocks 506 (that are sent before the set of environment metadata blocks 507) and a second set of backup data blocks 506 (that are sent after the environment metadata blocks 507). In these embodiments, operations/transactions for processing environment metadata blocks 507 are interleaved with the operations/transactions for processing backup data blocks 506 during a backup session.

In the example of FIG. 5C, the environment metadata blocks 507 include, for instance, relationship metadata and system metrics. In other embodiments, other types of environment metadata may be included. Relationship metadata included in the backup session may describe a relationship between the two computer systems (e.g., server system and storage system) involved in the backup session. For instance, the relationship metadata may specify that the backup session is for backing up data of a particular server system (having server system identifier X) to a particular storage system (having storage system identifier Y). In exemplary cases, relationship metadata may be included at or near the beginning of the sequence 575. However, a different sequence 575 may begin with other data or metadata blocks. The relationship metadata may be used later, for example, to perform a restore of data of the particular server system using the backup data that was stored to the particular storage system during the backup session. The relationship metadata may be used to identify and locate the backup data for the particular sever system during a restore.

Figure 6A:
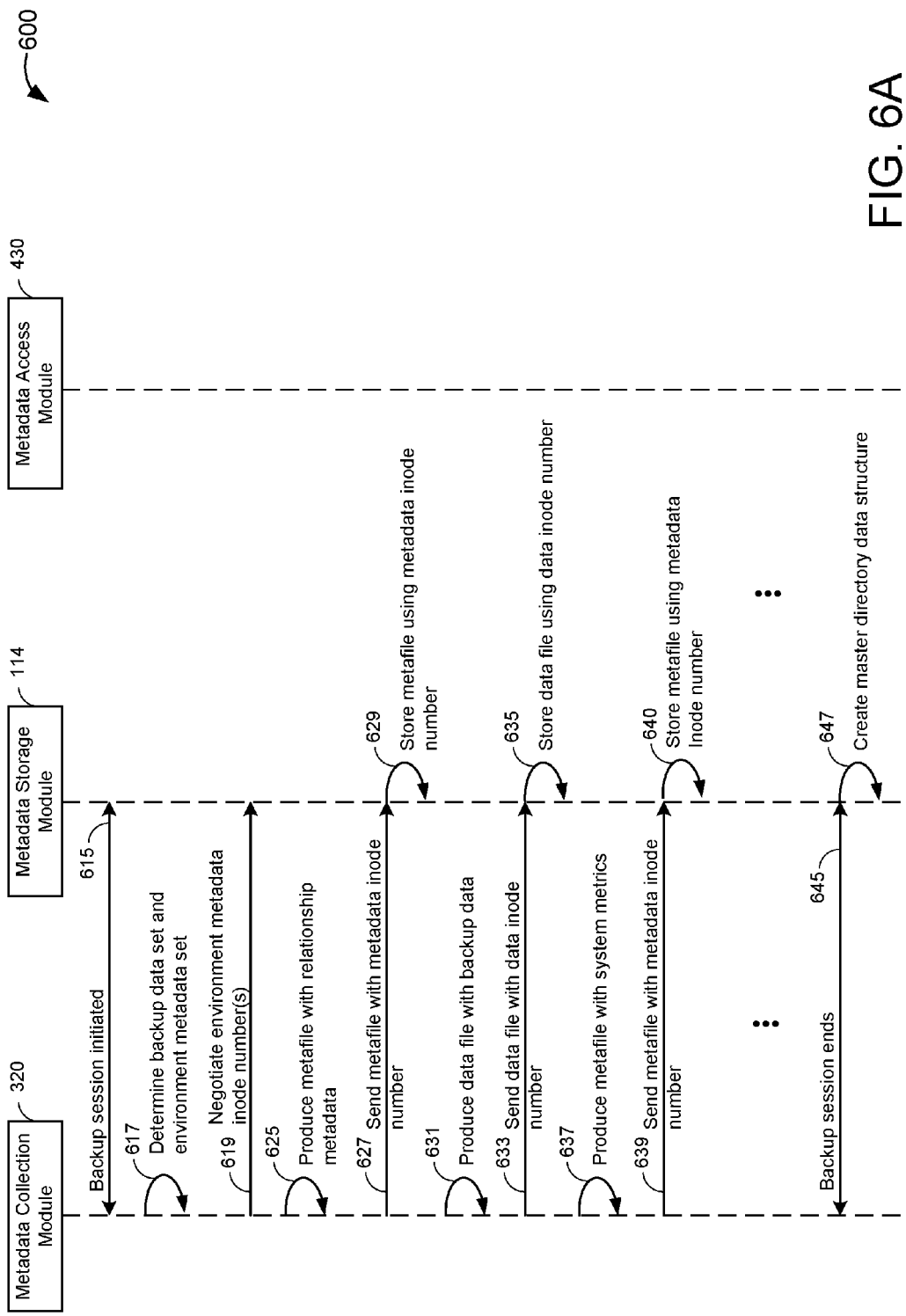
FIG. 6A is a diagram showing interactions between components within a storage environment during a backup session.
Figure 6B:
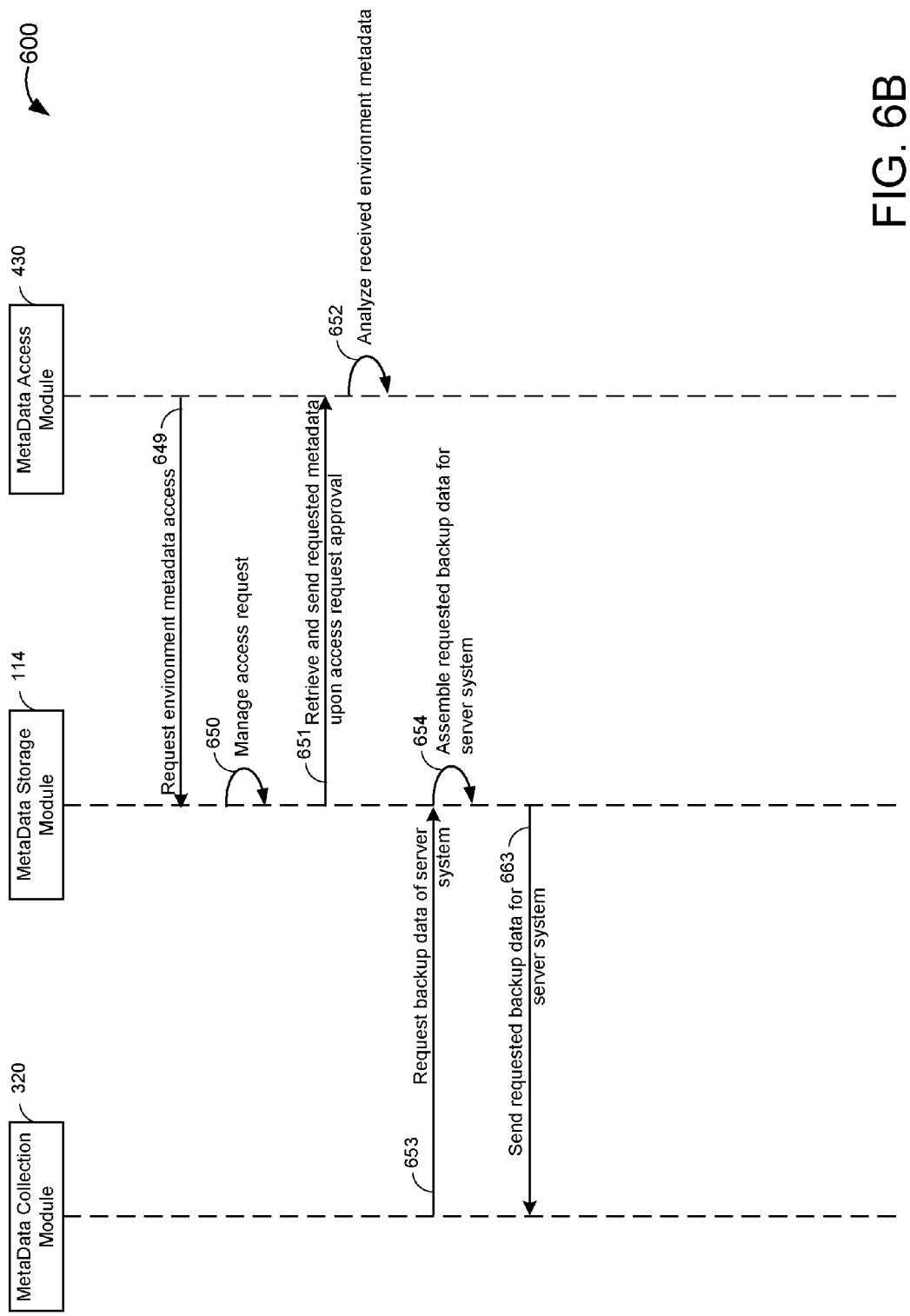
FIG. 6B is a diagram showing interactions between components within a storage environment for accessing environment metadata.

FIGS. 6A-B are diagrams showing an exemplary set of interactions, operations, and events 600 between components within a storage environment for producing and accessing environment metadata. FIG. 6A is a diagram showing interactions between components during a backup session and FIG. 6B is a diagram showing interactions between components for accessing environment metadata. As shown in FIGS. 6A-B, the components between which interactions are carried out may include a metadata collection module 320, a metadata storage module 114, and a metadata access module 430. In some embodiments, the metadata collection module 320 is hosted a server system 110, the metadata storage module 114 is hosted on a storage system 120, and the metadata access module 430 is hosted on a management server 140. In other embodiments, any module 320, 114, or 430 may be hosted on any of the server system 110, the storage system 120, or the management server 140. The order of events shown in the timeline of interactions 600 is exemplary only, and in other embodiments, a different order of events may be used.

Communication between the server system 110, the storage system 120, and the management server 140 may be carried out using any combination of block data transfers and/or packet transfers. For example, the metadata collection module 320 may request the services of a metadata storage module 114 by requesting operations pertaining to a backup of data from the server system 110 to a storage system 120, and may issue packets containing requests, and may transfer data using file-based access protocols. As another example, the server system 110 may request the services of the storage system by issuing packets in a particular sequence corresponding to a particular protocol (e.g., the LREP protocol). In particular, a metadata collection module 320 may request the services of metadata storage module 114 by issuing packets corresponding to the LREP protocol for requesting services. Also, any one of a metadata collection module 320, a metadata storage module 114, and/or a metadata access module 430 may perform operations (e.g., using a processor 326) in response to an asynchronous event, or synchronously in response to receipt of a message (i.e. a packet, or sequence of packets) from another module.

As shown in FIG. 6A, the interactions may begin when a backup session between a server system and storage system is initiated (event 615). The backup session may be initiated by the server system or the storage system. For example, the metadata collection module 320 residing on the server system may be responsive to a message from a metadata storage module 114 on the storage system suggesting the initiation of a backup session.

The metadata storage module 114 may produce relationship metadata specifying the relationship between the server system and the storage system involved in this backup session. In some embodiments, a relationship may be codified in a data structure, or may be codified in a file conforming to a pre-determined format. For example, a relationship may be defined using XML as shown in Table 1. As shown in Table 1, the relationship metadata may further specify aspects of the client platform, aspects of the backup being requested, aspects of applications running on the client platform, etc.

Table 1: Line-Oriented Listing of an XML File

```
<LR>
   <client>
      <hostname> galaxy </hostname>
      <os>
         <type> windows </type>
         <version> 2008 </version>
      </os>
      <ossv>
         <version> 3_0_2209_NOV23 </version>
      </ossv>
      <storage> 800 GB </storage>
   </client>
   <backup>
      <Secondary_path> /vol/ossv_vol/backup1 </Secondary_Path>
      <type> Application </type>
      <name> MSSQL </name>
      <version> 2005 </version>
   </backup>
   <app>
      <MSSQL>
         <storage> 180 GB </storage>
         <instance> 2 </instances>
         <db> 5 </db>
      </MSSQL>
      <MSEXCHANGE>
         <storage> </storage>
         <storagegroup> </storagegroup>
         <db> </db>
      </MSEXCHANGE>
      <MSSHAREPOINT>
         <storage> </storage>
         <storagegroup> </storagegroup>
         <db> </db>
      </MSSHAREPOINT>
      <ORACLE>
         <storage> </storage>
         <instance> </instance>
         <db> </db>
      </ORACLE>
      <HYPERV>
         <storage> </storage>
         <vm> </vm>
      </HYPERV>
      <VMWARE>
         <storage> </storage>
         <vm> </vm>
      </VMWARE>
   </app>
</LR>
```

After the backup session is initiated, the metadata collection module 320 may determine (at event 617) a backup data set and an environment metadata set. The backup data set may comprise all the data of the server system that is to be backed up to the storage system during this backup session (e.g., client data, application data, etc.). For example, the metadata collection module 320 may assemble a list of backup data files to be backed up. The environment metadata set may comprise all the produced and collected environment metadata for the server system that is also to be sent to the storage system along with the backup data set during this backup session.

One or more environment metadata inode number(s) 503 may then be negotiated (see event 619) between the metadata collection module 320 and the metadata storage module 114, the environment metadata inode number(s) 503 indicating the address locations (e.g., a block identifier or a file path identifier) of where environment metadata blocks 507 will be stored on the storage system. For example, metadata collection module 320 may submit a request for one or more environment metadata inode number(s) 503 and the metadata storage module 114 may respond by sending one or more environment metadata inode number(s) 503 for storing the environment metadata blocks 507 in the environment metadata set. As another example, the metadata collection module 320 may submit a request for one or more environment metadata inode number(s) 503 and the metadata storage module 114 may respond by sending a metadata file.

The metadata collection module 320 may then begin preparing and sending, to the metadata storage module 114, a sequence 575 of backup data blocks 506 and environment metadata blocks 507 during the backup session. In some embodiments, the sequence 575 comprises environment metadata blocks 507 interleaved with backup data blocks 506. The metadata storage module 114 receives and stores the sequence 575 of backup data blocks 506 and environment metadata blocks 507 during the backup session.

For example, the metadata collection module 320 may produce a first metafile comprising relationship metadata (operation 625) and send the first metafile (operation 627), along with a first environment metadata inode number 503, to the metadata storage module 114. The metadata storage module 114 may then store the received first metafile (comprising the relationship metadata) into metadata blocks 507 using the received first metadata inode number 503 (operation 629). The metadata collection module 320 may then produce a first data file comprising backup data (operation 631) and send the first data file (operation 633), along with a first backup data inode number 501, to the metadata storage module 114. The metadata storage module 114 may then store the received first data file (comprising the backup data) into data blocks 506 using the received first backup data inode number 501 (operation 635). The metadata collection module 320 may then produce a second metafile comprising system metrics (operation 637) and send the second metafile (operation 639), along with a second environment metadata inode number 503, to the metadata storage module 114. The metadata storage module 114 may then store the received second metafile (comprising the system metrics) into metadata blocks 507 using the received second metadata inode number 503 (operation 640). The metadata collection module 320 may continue to send environment metadata with metadata inode numbers and backup data with data inode numbers and the metadata storage module 114 may continue to store the received environment metadata according to the metadata inode numbers and backup data according to the data inode numbers. The specific sequence of sending and storing data and metadata is not limited by the embodiment shown in FIG. 6A, however, and any other sequence may be used.

After all backup data in the backup data set and all environment metadata in the environment metadata set is sent to the metadata storage module 114, the backup session ends (at event 645). In some embodiments, the sequence 575 of backup data blocks 506 and environment metadata blocks 507 sent to the metadata storage module 114 during the backup session comprises all the data in the backup data set and all environment metadata in the environment metadata set. In some embodiments, the sequence 575 of backup data blocks 506 and environment metadata blocks 507 is sent to the metadata storage module 114 after the time the backup session is initiated and before the backup session ends. In these embodiments, the sequence 575 of backup data blocks 506 and environment metadata blocks 507 is sent to the metadata storage module 114 in response to the backup session being initiated and the backup session ends in response to the completion of sending the sequence 575.

The backup session may be repeated for other server systems. As such, a storage system may receive and store backup data and environment metadata for one or more server systems, and may be considered a repository of environment metadata for various server systems.

The metadata storage module 114 may then produce or update a master directory data structure 850 (operation 647) based on the received sequence 575 of backup data blocks 506 and environment metadata blocks 509 and data and metadata inode numbers. The metadata storage module 114 may be used for tracking and managing access to the backup data and environment metadata of various server systems. For example, the master directory data structure 850 may comprise entries representing data files and metafiles of a particular server system, as well as access permissions specified for each data file and metafile. The master directory data structure 850 is more fully discussed in relation to FIG. 8.

FIG. 6B is a diagram showing interactions between components for accessing environment metadata. In general, the metadata access module 430 may request access to the environment metadata of various server systems for analysis (e.g., for performance optimization, monitoring, maintenance, etc.). The metadata storage module 114 may manage access to the environment metadata by allowing or denying such access requests using the master directory data structure 850.

In particular, the metadata access module 430 may submit a request to access the environment metadata (event 649) of a particular server system. For example, the access request may specify the identifier of the server system for which it is requesting the environment metadata. For example, the access request may further include information about the user that is submitting the access request (via the metadata access module 430), such as the user login name/identifier and/or user type (e.g., administrator, general user, etc.).

The metadata storage module 114 may then manage the access request by determining whether to allow to deny the access request (event 650) using a master directory data structure 850. For example, the metadata storage module 114 may determine whether the particular user submitting the access request has permission to access and view the environment metadata of the particular server system by comparing the information about the user (received in the access request) to the permissions specified for the requested environment metadata in the master directory data structure 850.

In the example shown in FIG. 6B, the metadata storage module 114 has determined that the user does have such permission and therefore retrieves and sends the requested environment metadata (operation 651), for example, by sending one or more metafile(s) (or portions thereof) to the requesting user/metadata access module 430. The metadata storage module 114 may do so by using a metadata inode number 503 specified for the requested environment metadata as stored in the master directory data structure 850. After receiving the requested environment metadata, the metadata access module 430 may then process/analyze (e.g., for performance optimization, monitoring, maintenance, etc.) the environment metadata (operation 652).

However, if the metadata storage module 114 has determined that the user does not have such permission, it denies access to the requested environment metadata, for example, by sending an error message and not retrieving and sending the requested environment metadata. As such, the metadata storage module 114 in effect causes the environment metadata and metafiles to be stored as "hidden" environment metadata and metafiles that may be accessed and viewed only by those users permitted to do so.

In the example shown in FIG. 6B, the master directory data structure 850 may also be used to perform a restore of backup data for a particular server system. In these embodiments, a metadata collection module 320 of a server system, on which a restore is being performed, may submit a request to the metadata storage module 114 for backup data of the server system (operation 653), the request specifying an identifier for the server system.

The metadata storage module 114 may receive the request and then assemble the requested backup data for the specified server system (operation 654) using the master directory data structure 850. For example, the metadata storage module 114 may assemble a set of blocks/files to send to the requesting metadata collection module 320. The set may be assembled from the blocks/files that were previously received and stored for the specified server system by using the master directory data structure to locate the blocks/files for the specified server system. The metadata storage module 114 may also use the master directory data structure to determine which blocks/files for the specified server system are backup data blocks/files and which are metadata blocks/files, whereby the backup data blocks/files are included in the set and the metadata blocks/files are excluded from the set. This ensures that only the backup data blocks/files are sent to the requesting metadata collection module 320 and the metadata blocks/files are still hidden from the metadata collection module 320. The assembled set of backup data is then sent to the requesting metadata collection module 320 (operation 663).

Figure 7:
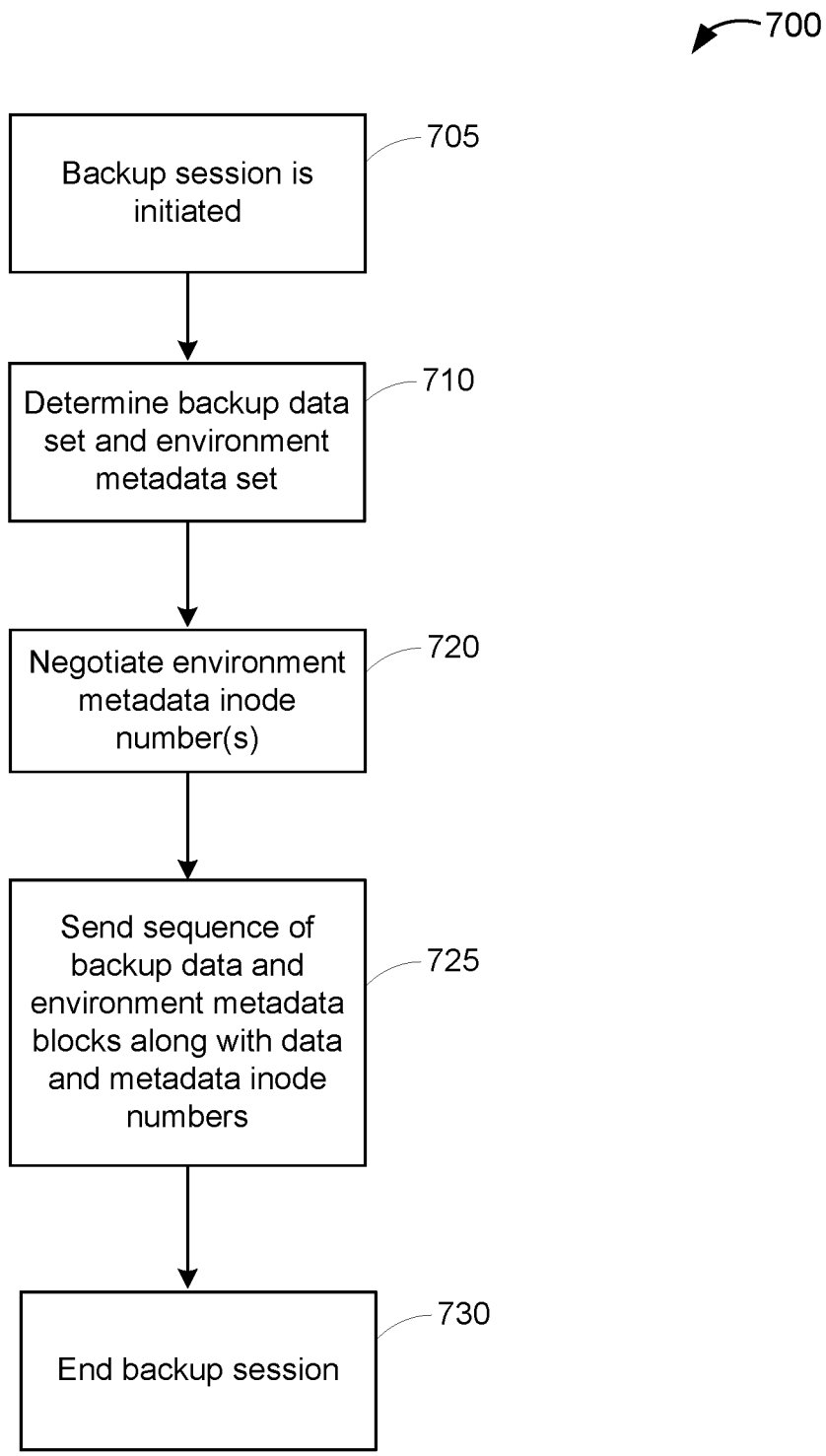
FIG. 7 is a flowchart of a backup session for sending environment metadata within a storage environment.

FIG. 7 is a flowchart of a backup session method 700 for sending environment metadata within a storage environment. In some embodiments, the backup method 700 is implemented by hardware and/or by one or more software-executing processors configured to perform the backup method 700. In some embodiments, the steps of backup method 700 are performed by various hardware and/or software-executing processor components residing or executing on a server system 110, a storage system 120, and/or the management server 140. For example, the backup method 700 may be performed by the metadata collection module 320 hosted a server system 110. The order and number of steps of the backup method 700 are for illustrative purposes only and, in other embodiments, a different order and/or number of steps are used.

The backup method 700 begins when a backup session is initiated (at 705) for backing up data of a server system to a storage system. For example, the server system or the storage system may initiate the backup session. The method 700 may then determine (at 710) a backup data set and an environment metadata set. The backup data set may comprise all the data of the server system that is to be backed up to the storage system during the backup session (e.g., client data, application data, etc.). The environment metadata set may comprise all the produced and collected environment metadata for the server system that is also to be sent to the storage system along with the backup data set during this backup session.

The method 700 then negotiates (at 720) one or more environment metadata inode number(s) 503 with the metadata storage module 114, the environment metadata inode number(s) 503 indicating the address locations (e.g., a block identifier, a file path identifier, etc) of where environment metadata blocks 507 will be stored on the storage system. For example, the method 700 may submit a request for one or more environment metadata inode number(s) 503 to the metadata storage module 114 and the metadata storage module 114 may respond by sending one or more environment metadata inode number(s) 503 for storing the environment metadata blocks 507.

The method 700 may then sends (at 725), to the metadata storage module 114, a sequence 575 of backup data blocks 506 and environment metadata blocks 507 along with data inode numbers and metadata inode numbers. In some embodiments, the sequence 575 comprises environment metadata blocks 507 interleaved with backup data blocks 506. After all backup data in the backup data set and all environment metadata in the environment metadata set is sent to the metadata storage module 114, the method 700 ends the backup session (at 730). The backup method 700 may be repeated for other server systems. As such, a storage system may receive and store backup data and environment metadata for one or more server systems, and may be considered a repository of environment metadata for various server systems.

FIG. 8 shows a conceptual diagram of an exemplary master directory data structure 850. The master directory data structure 850 may be stored, for example, to a storage device 125 and loaded to memory 224 of a storage system 120. The master directory data structure 850 may be used for various purposes, for example, for recording/tracking storage locations of received backup data blocks/files and/or environment metadata blocks/files, recording access permissions associated with the backup data blocks/files and/or environment metadata blocks/files, recording the type of received block/file (backup data or environment metadata), etc. As shown in FIG. 8, the master directory data structure 850 may comprise a plurality of entries representing backup data blocks/files or environment metadata blocks/files for a plurality of server systems. Each entry may comprise a plurality of data fields for storing information regarding the represented data or metadata block/file.

For example, for a data or metadata file, an entry may contain a path field 815 for storing an address location (e.g., file system path) specifying where the data or metadata file is stored. For example, for a data or metadata block, an entry may contain a block number field 815 for storing a block number (e.g., logical block number) of the data or metadata block. Also, an entry representing a data or metadata block/file may contain a server system ID field 820 for storing an identifier of the server system from which the represented data or metadata block/file was received. Further, an entry representing a data or metadata block/file may contain a block/file type field 825 for storing a type (data or metadata) of the block/file.

In addition, an entry representing a data or metadata block/file may contain a permission field 830 for storing a list of access permissions for the represented data or metadata block/file. For example, the list of access permissions may specify which specific users or user types (e.g., administrators, general users, etc.) that are permitted to access the represented data or metadata block/file. Further, an entry representing a data or metadata block/file may contain a visibility field 840 for storing one or more visibility flags 840. In some embodiments, even if a user is properly credentialed (e.g. is authenticated, and has one or more defined permissions), some modes of operation enforce a combination of permission and visibility indicators.

For example, a particular metadata block or file may be hidden to users by enforcement of a corresponding permission and/or visibility combination of accept/deny flags known in the art. A permission can be described using an accept/deny flag (e.g., using the permission accept/deny list 830), and a visibility flag 840 can be described using an accept/deny indicator. The accept/deny flags can be used in conjunction with the negotiated inode number.

TABLE 2

Exemplary Modes for Access

| Requestor | Type of inode | Access Result |
|---|---|---|
| Backup Server | metadata inode | Override Permissions/Flags (Deny/Hide Access to Metadata) |
| Metadata Access Server | <any> | Observe Permissions/Flags |
| Unknown (or not authenticated) | metadata inode | Hide Access |

As can be seen from Table 2, access to a particular metadata block or file can be at least in part controlled by accessing a master directory data structure and then allowing or denying access to a request for the requested metadata based on the metadata inode number. In one case, even if the requestor is an unknown requestor, or even if the requestor has not provided credentials so as to permit authentication, the requested access to metadata can be controlled by accessing a master directory data structure and then denying access to a request for the metadata based solely on the metadata inode number (e.g. see the bottom row in Table 2).

Figure 9:
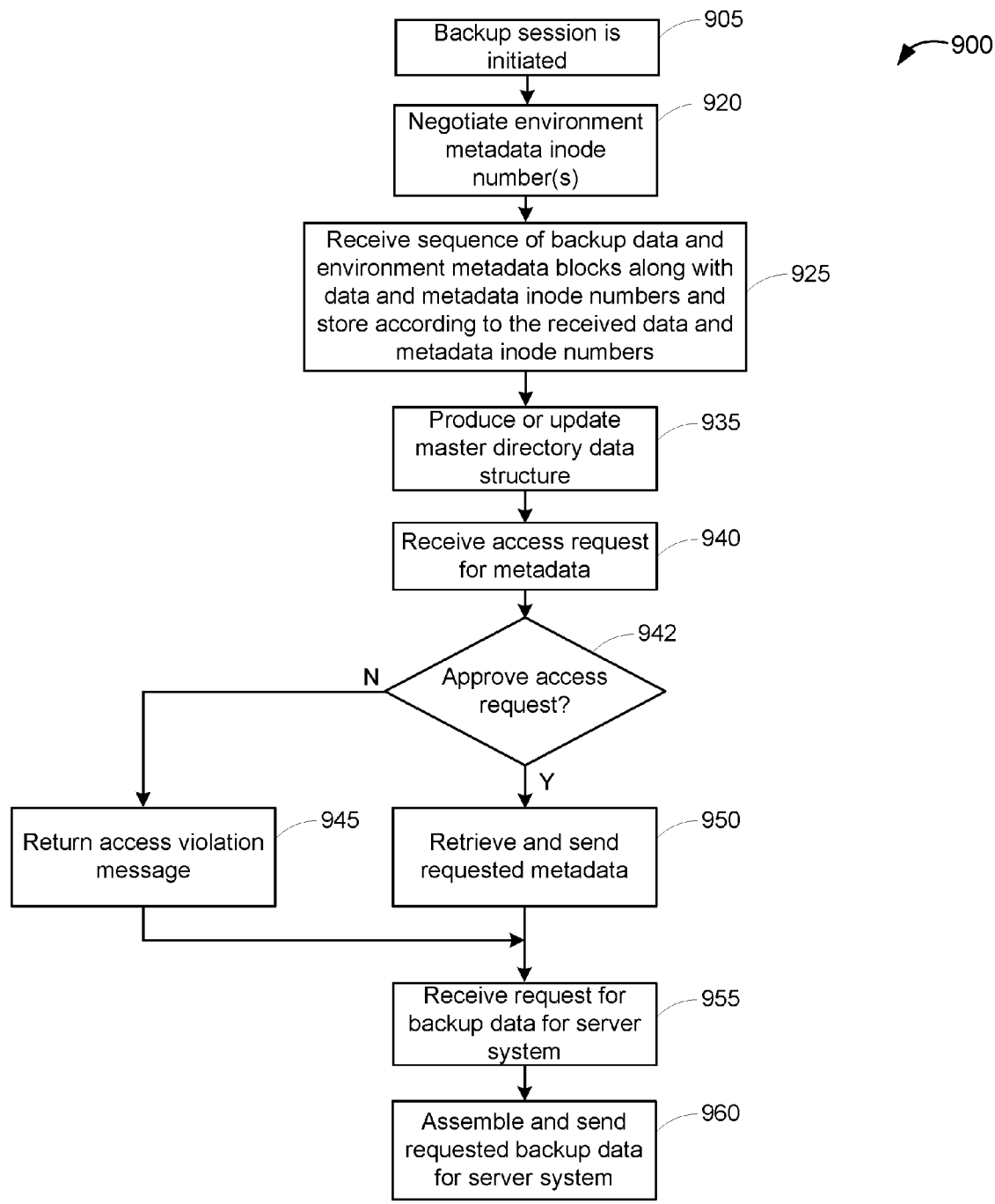
FIG. 9 is a flowchart of method for storing and managing access to environment metadata and backup data within a storage environment.

FIG. 9 is a flowchart of method 900 for storing and managing access to environment metadata and backup data within a storage environment. In some embodiments, the method 900 is implemented by hardware and/or one or more software-executing processors configured to perform the method 900. In some embodiments, the steps of method 900 are performed by various hardware components and/or one or more software-executing processors residing or executing on the server system 110, the multi-node storage system 120, and/or the management server 140. For example, the method 900 may be performed by the metadata storage module 114 hosted on the storage system 120. The order and number of steps of the method 900 are for illustrative purposes only and, in other embodiments, a different order and/or number of steps may be used.

The backup method 900 begins when a backup session is initiated (at 905) for backing up data of a server system to a storage system. The method 900 then negotiates (at 920) one or more environment metadata inode number(s) 503 with the metadata collection module 320 residing on the server system. For example, the method 900 may receive a request for one or more environment metadata inode number(s) 503 and respond by sending one or more environment metadata inode number(s) 503 to the metadata collection module 320.

The method 900 may then receive (at 925), from the metadata collection module 320, a sequence 575 of backup data blocks 506 and environment metadata blocks 509 along with data inode numbers and metadata inode numbers and stores the sequence 575 according to the received data and metadata inode numbers. The method 900 may then produce or update a master directory data structure 850 (at 935) based on the received sequence 575 of backup data blocks 506 and environment metadata blocks 509 and data and metadata inode numbers. The metadata storage module 114 may be used for tracking and managing access to the backup data and environment metadata of various server systems. For example, the master directory data structure 850 may comprise entries representing data files and metafiles of a particular server system, as well as access permissions specified for each data file and metafile.

The method 900 may then receive (at 940), from a metadata access module 430 hosted on a management server 140, a request to access the environment metadata of a particular server system. For example, the access request may specify the identifier of the server system for which it is requesting the environment metadata. For example, the access request may further include information about the user that is submitting the access request (via the metadata access module 430), such as the user login name/identifier and/or user type (e.g., administrator, general user, etc.).

The method 900 may then determine (at 942) whether to approve or deny the access request using the master directory data structure 850. For example, the method may determine whether the particular user submitting the access request has permission to access and view the environment metadata of the particular server system by comparing the information about the user (received in the access request) to the permissions specified for the requested environment metadata in the master directory data structure 850. If the access request is not approved, the method 900 denies access to the requested environment metadata and returns (at 945) an access violation message to the requesting metadata access module 430. The method 900 continues at step 955.

If the access request is approved, the method 900 retrieves and sends (at 950) the requested environment metadata, for example, by sending one or more metafile(s) (or portions thereof) to the requesting user/metadata access module 430. The method 900 may do so by using a metadata inode number 503 specified for the requested environment metadata as stored in the master directory data structure 850.

The method 900 may then receive (at 955) a request, from a metadata collection module 320 of a server system, a request for backup data of the server system to perform a restore, the request specifying an identifier for the server system. The method 900 may assemble and send (at 960) the requested backup data for the specified server system using the master directory data structure 850. For example, the method 900 may assemble a set of blocks/files to send to the requesting metadata collection module 320 by using the master directory data structure to locate the blocks/files for the specified server system and to determine which blocks/files for the specified server system are backup data blocks/files and which are metadata blocks/files, whereby the backup data blocks/files are included in the set and the metadata blocks/files are excluded from the set. The method 900 then ends.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software-executing processors, or combinations of both. To illustrate this interchangeability of hardware and software-executing processors, various illustrative components, blocks, modules, circuits, and steps have been described herein generally in terms of their functionality. Whether such functionality is implemented as hardware or by using software-executing processors depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in one or more software-executing processors, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system for managing environment metadata of a server system during a backup session with a storage system, the system comprising:

the server system comprising computer hardware configured for:

identifying backup data and environment metadata;

negotiating with the storage system after the backup session is initiated, one or more address location for storing the environment metadata by the storage system;

generating a metafile for relationship metadata that describes a relationship between the server system and the storage system for use in any restore operation that is based on the backup session, where the relationship metadata is part of the environment metadata;

during the backup session, sending a sequence of blocks comprising the relationship metadata, the backup data and the environment metadata to the storage system, the environment metadata describing one or more server metrics of the server system, a server metric relating to power consumption, data capacity, data throughput, or processor utilization of the server system from which the data is being transmitted, the server system being distinct from the storage system;

the storage system comprising computer hardware configured for:

receiving and storing the sequence of blocks comprising the relationship metadata, the backup data and the environment metadata at the negotiated location; and producing a directory data structure for recording storage locations of the received backup data and environment metadata, a block type specifying a backup data or environment metadata type, and access permissions associated with the environment metadata; wherein the access permissions and the negotiated one or more address locations are used for allowing or denying access to the environment metadata by the server system;

wherein the storage system is further configured for:

receiving a request for restoring data of the server system;

using the directory data structure for assembling the backup data for the server system by including blocks that comprise the backup data for the server system and excluding blocks that comprise environment metadata for the server system; and sending the assembled backup data to the server system.

2. The system of claim 1, wherein the sequence of backup data and environment metadata is sent to the storage system in response to the backup session being initiated and the backup session ends in response to completion of sending the sequence to the storage system.

3. The system of claim 1, wherein backup data comprises client data received from one or more client computer systems or application data for one or more applications executing on the server system.

4. The system of claim 1, wherein the storage system is further configured for:

receiving an access request for accessing the environment metadata of the server system;

using the directory data structure for determining whether a user has permission to access the environment metadata of the server system; and upon determining that the user has permission to access the environment metadata of the server system, allowing the user to access the environment metadata.

5. The system of claim 1, wherein the sequence comprises environment metadata interleaved with backup data, wherein the backup data and the environment data are alternately sent to the storage system and operations for processing the environment metadata are interleaved with operations for processing the backup data during the backup session.

6. A method for managing environment metadata of a server system during a backup session with a storage system, the method comprising:

identifying, by the server system, backup data and environment metadata;

negotiating with the storage system after the backup session is initiated, one or more address locations for storing the environment metadata by the storage system;

generating a metafile for relationship metadata that describes a relationship between the server system and the storage system for use in any restore operation that is based on the backup session, where the relationship metadata is part of the environment metadata;

during the backup session, from the server system, sending a sequence of blocks comprising the relationship metadata, the backup data and the environment metadata to the storage system, the environment metadata describing one or more server metrics of the server system, a server metric relating to power consumption, data capacity, data throughput, or processor utilization of the server system from which the data is being transmitted, the server system being distinct from the storage system;

at the storage system, receiving and storing the sequence of blocks comprising the relationship metadata, the backup data and the environment metadata at the negotiated location;

at the storage system, producing a directory data structure for recording storage locations of the received backup data and environment metadata, a block type specifying a backup data or environment metadata type, and access permissions associated with the environment metadata wherein the access permissions and the negotiated one or more address locations are used for allowing or denying access to the environment metadata by the server system;

at the storage system, receiving a request for restoring data of the server system;

at the storage system, using the directory data structure for assembling the backup data for the server system by including blocks that comprise the backup data for the server system and excluding blocks that comprise environment metadata for the server system; and at the storage system, sending the assembled backup data to the server system.

7. The method of claim 6, wherein the sequence of backup data and environment metadata is sent to the storage system in response to the backup session being initiated and the backup session ends in response to completion of sending the sequence to the storage system.

8. The method of claim 6, wherein backup data comprises client data received from one or more client computer systems or application data for one or more applications executing on the server system.

9. The method of claim 6, further comprising:

at the storage system, receiving an access request for accessing the environment metadata of the server system;

at the storage system, using the directory data structure for determining whether a user has permission to access the environment metadata of the server system; and at the storage system, upon determining that the user has permission to access the environment metadata of the server system, allowing the user to access the environment metadata.

10. The method of claim 6, wherein the sequence comprises environment metadata interleaved with backup data, wherein the backup data and the environment data are alternately sent to the storage system and operations for processing the environment metadata are interleaved with operations for processing the backup data during the backup session.

11. A non-transitory computer readable medium having instructions stored thereon when executed by a processor, manage environment metadata of a server system during a backup session with a storage system, the non-transitory computer readable medium comprising sets of instructions for:

identifying, by the server system, backup data and environment metadata;

negotiating with the storage system after the backup session is initiated, one or more address location for storing the environment metadata by the storage system;

generating a metafile for relationship metadata that describes a relationship between the server system and the storage system for use in any restore operation that is based on the backup session, where the relationship metadata is part of the environment metadata;

during the backup session, from the server system, sending a sequence of blocks comprising the relationship metadata, the backup data and environment metadata to the storage system, the environment metadata describing one or more server metrics of the server system, a server metric relating to power consumption, data capacity, data throughput, or processor utilization of the server system from which the data is being transmitted, the server system being distinct from the storage system;

at the storage system, receiving and storing the sequence of blocks comprising the relationship metadata, the backup data and the environment metadata at the negotiated location;

at the storage system, producing a directory data structure for recording storage locations of the received backup data and environment metadata, a block type specifying a backup data or environment metadata type, and access permissions associated with the environment metadata wherein the access permissions and the negotiated one or more address locations are used for allowing or denying access to the environment metadata by the server system;

at the storage system, receiving a request for restoring data of the server system;

at the storage system, using the directory data structure for assembling the backup data for the server system by including blocks that comprise backup data for the server system and excluding blocks that comprise the environment metadata for the server system; and at the storage system, sending the assembled backup data to the server system.

12. The non-transitory computer readable medium of claim 11, wherein the sequence of backup data and environment metadata is sent to the storage system in response to the backup session being initiated and the backup session ends in response to completion of sending the sequence to the storage system.

13. The non-transitory computer readable medium of claim 11, wherein backup data comprises client data received from one or more client computer systems or application data for one or more applications executing on the server system.

14. The non-transitory computer readable medium of claim 11, further comprising sets of instructions for:

at the storage system, receiving, from a user, an access request for accessing the environment metadata of the server system;

at the storage system, using the directory data structure for determining whether the user has permission to access the environment metadata of the server system; and at the storage system, upon determining that the user has permission to access the environment metadata of the server system, allowing the user to access the environment metadata.

15. The non-transitory computer-readable medium of claim 11, wherein the sequence comprises environment metadata interleaved with backup data, wherein the backup data and the environment data are alternately sent to the storage system and operations for processing the environment metadata are interleaved with operations for processing the backup data during the backup session.

16. A method for managing environment metadata of a server system during a backup session with a storage system, the method comprising:

identifying backup data and environment metadata;

initiating the backup session for backing up data of the server system to the storage system;

negotiating with the storage system after the backup session is initiated, one or more address location for storing the environment metadata by the storage system;

generating a metafile for relationship metadata that describes a relationship between the server system and the storage system for use in any restore operation that is based on the backup session, where the relationship metadata is part of the environment metadata;

sending a sequence of blocks comprising the relationship metadata, the backup data and environment metadata of the server system to the storage system, the environment metadata describing one or more server metrics of the server system, a server metric relating to power consumption, data capacity, data throughput, or processor utilization of the server system from which the data is being transmitted, the server system being distinct from the storage system;

receiving and storing the sequence of blocks comprising the relationship metadata, the interleaved backup data and environment metadata at the negotiated location;

producing a directory data structure for managing the backup data and environmental metadata and stores access permissions associated with the environment metadata; wherein the access permissions and the negotiated one or more address locations are used for allowing or denying access to the environment metadata by the server system;

receiving a request for restoring data of the server system;

using the directory data structure for assembling the backup data for the server system by including blocks that comprise backup data for the server system and excluding blocks that comprise the environment metadata for the server system; and sending the assembled backup data to the server system.

17. The method of claim 16, wherein the backup session when the server system submits a backup request to the storage system for backing up some or all data stored on the server system.

18. The method of claim 16, wherein the backup session when a management server submits a backup request to the storage system for backing up some or all data stored on the server system.

19. The method of claim 16, wherein producing the directory data structure is for recording storage locations of the received backup data and environment metadata, a block type specifying a backup data or environment metadata type, and access permissions associated with the environment metadata.

20. The method of claim 16, wherein the sequence of backup data and environment metadata is sent to the storage system in response to the backup session being initiated and the backup session ends in response to completion of sending the sequence to the storage system.

21. The method of claim 16, wherein backup data comprises client data received from one or more client computer systems or application data for one or more applications executing on the server system.

22. The method of claim 16, further comprising:

receiving an access request for accessing the environment metadata of the server system;

using the directory data structure for determining whether a user has permission to access the environment metadata of the server system; and determining that the user has permission to access the environment metadata of the server system, allowing the user to access the environment metadata.

23. The method of claim 16, wherein the sequence comprises environment metadata interleaved with backup data, wherein the backup data and the environment data are alternately sent to the storage system and operations for processing the environment metadata are interleaved with operations for processing the backup data during the backup session.

* * * * *